(12) United States Patent
George et al.

(10) Patent No.: US 7,511,895 B2
(45) Date of Patent: *Mar. 31, 2009

(54) APPARATUS AND METHOD FOR EXTENDED DEPTH OF FIELD IMAGING

(75) Inventors: Nicholas George, Pittsford, NY (US); Wanli Chi, Rochester, NY (US)

(73) Assignee: Aptina Imaging Corporation, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 11/956,553

(22) Filed: Dec. 14, 2007

(65) Prior Publication Data

US 2008/0089598 A1    Apr. 17, 2008

Related U.S. Application Data

(63) Continuation-in-part of application No. 10/908,287, filed on May 5, 2005, now Pat. No. 7,336,430.

(60) Provisional application No. 60/522,990, filed on Nov. 30, 2004, provisional application No. 60/607,076, filed on Sep. 3, 2004.

(51) Int. Cl.
*G02B 13/00* (2006.01)
*G02B 3/00* (2006.01)
*G02B 13/18* (2006.01)
*G02B 3/02* (2006.01)

(52) U.S. Cl. .................... 359/722; 359/708

(58) Field of Classification Search ............ 359/637, 359/708, 722, 723, 709, 620; 382/255, 279, 382/284

See application file for complete search history.

(56) References Cited

U.S. PATENT DOCUMENTS 7,336,430 B2 *   2/2008   George et al. ............... 359/708

FOREIGN PATENT DOCUMENTS

GB    WO 93/14384    *    7/1993

OTHER PUBLICATIONS

S. F Gull and J.Skillin; Maximum Entropy Method in Image Processing; IEE vol. 131, No. 6. Oct. 1984.*

* cited by examiner

*Primary Examiner*—Alicia M Harrington
(74) *Attorney, Agent, or Firm*—William Greener; Bond, Schoeneck & King, PLLC

(57) ABSTRACT

An extended depth of field is achieved by a computational imaging system that combines a multifocal imaging subsystem for producing a purposefully blurred intermediate image with a digital processing subsystem for producing a recovered image having an extended depth of field. The multifocal imaging system exhibits spherical aberration as the dominant feature of the purposeful blur. In an aspect, a central obscuration of the multifocal imaging subsystem renders point-spread functions of object points more uniform over a range of object distances, however, the system may not include a centrally obscured aperture to achieve intended results. An iterative digital deconvolution algorithm for converting the intermediate image into the recovered image based on maximum entropy involves a metric parameter that speeds convergence, avoids stagnations, and enhances image quality.

18 Claims, 36 Drawing Sheets

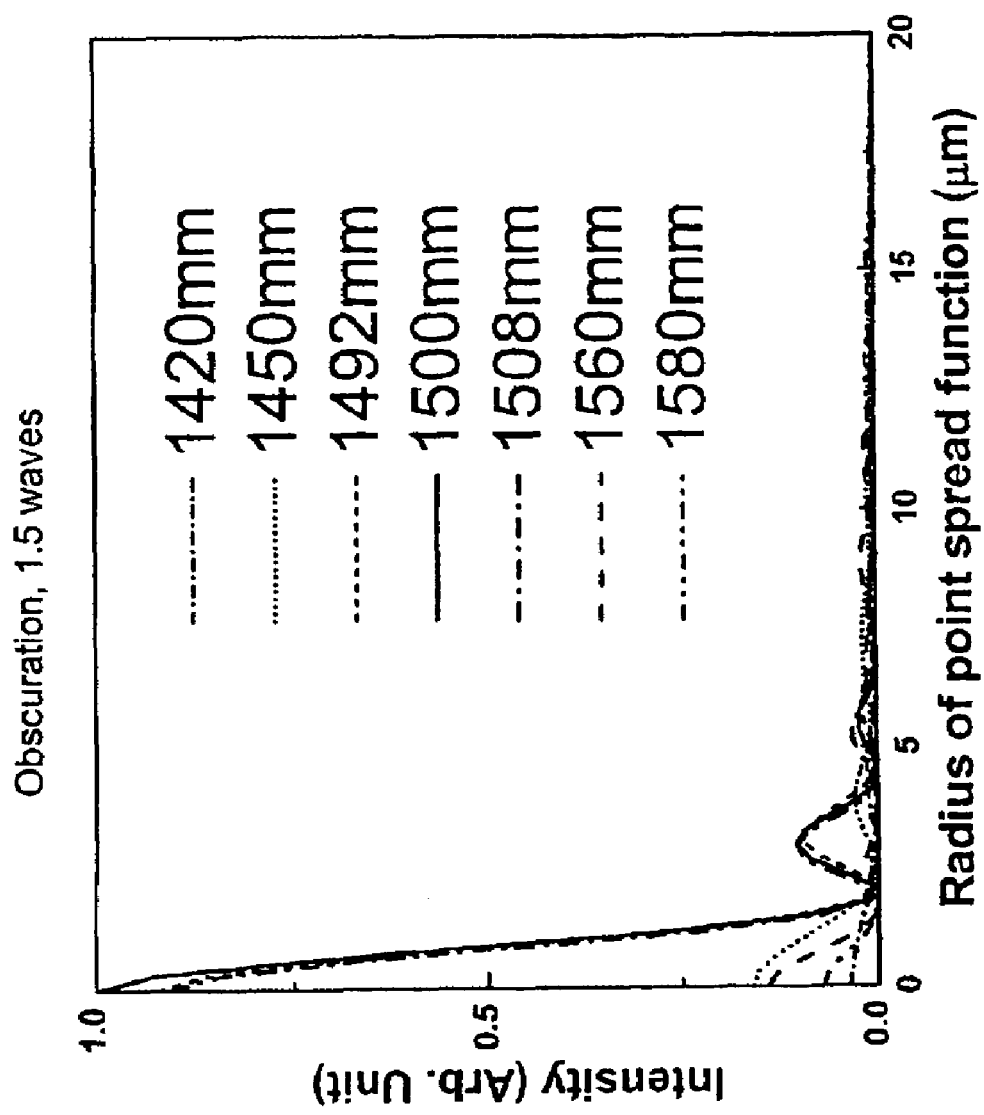

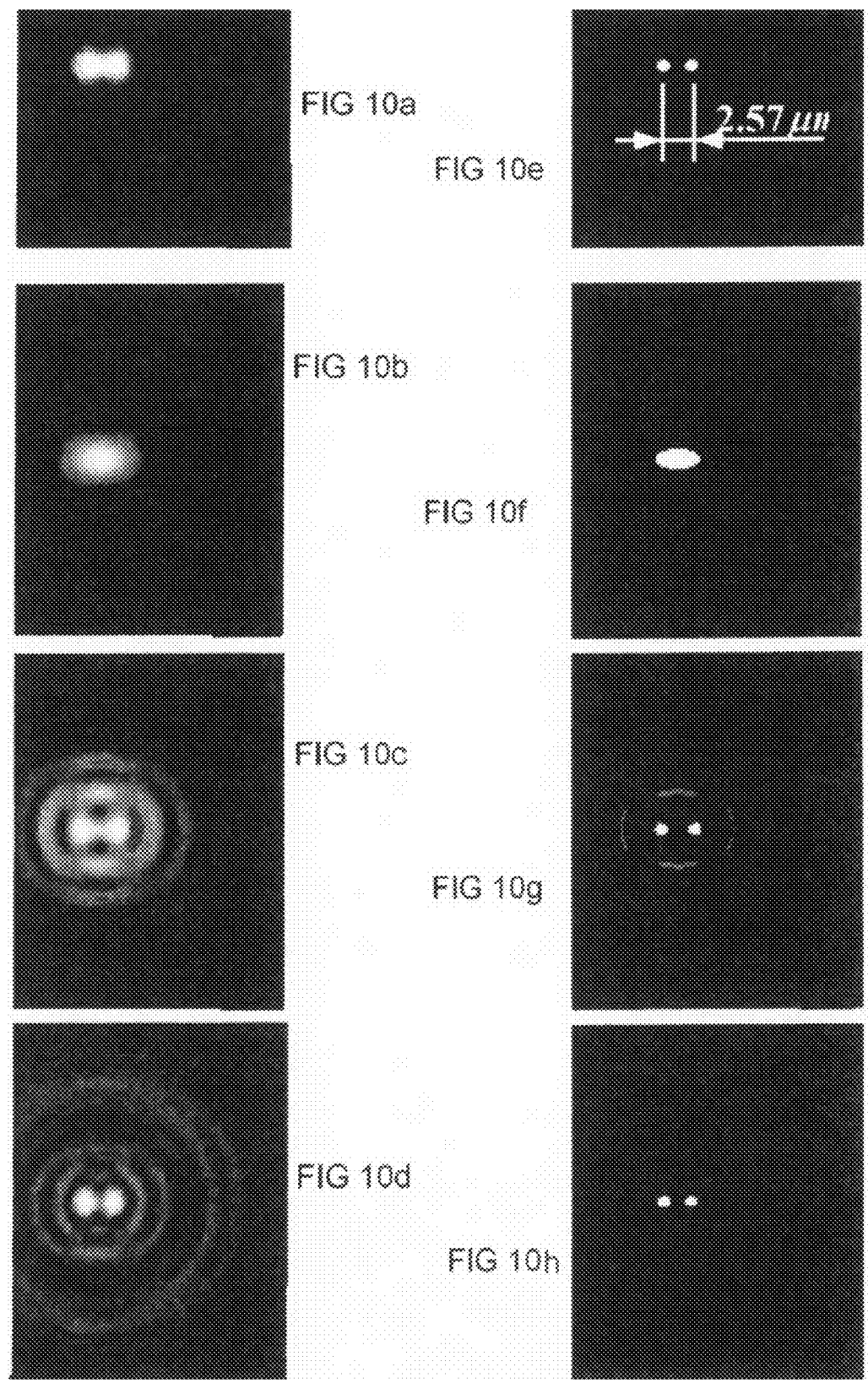

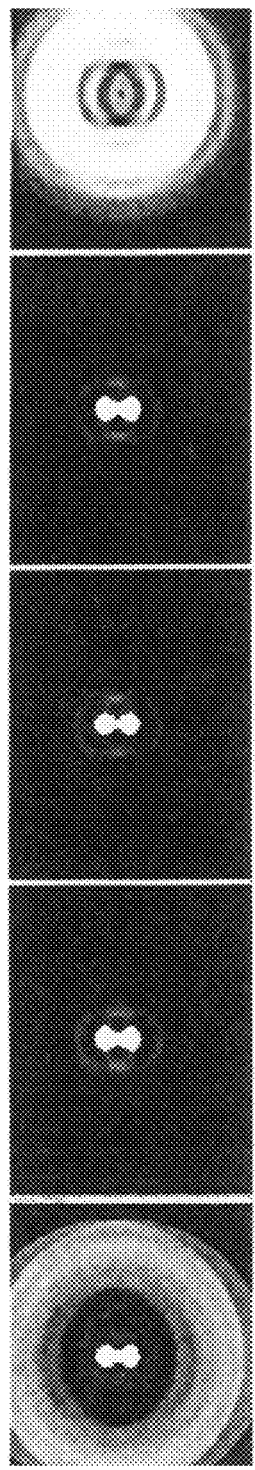
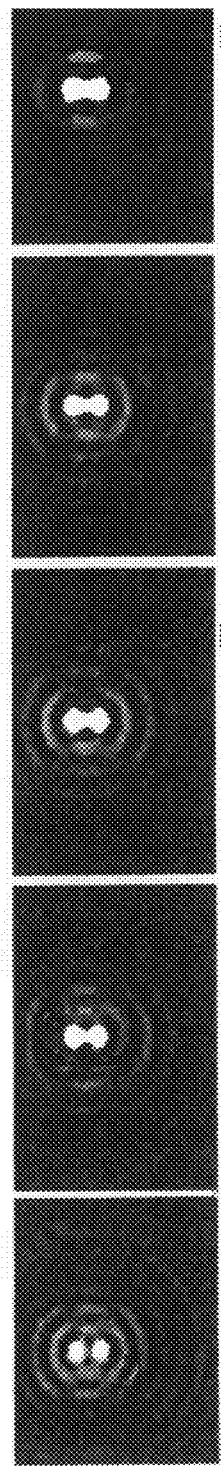
FIG 11a
FIG 11b
FIG 11c
FIG 11d
FIG 11e
FIG 11f
FIG 11g
FIG 11h
FIG 11i
FIG 11j
FIG 11k
FIG 11l
FIG 11m
FIG 11n
FIG 11o

APPARATUS AND METHOD FOR EXTENDED DEPTH OF FIELD IMAGING

CROSS-REFERENCE TO RELATED APPLICATIONS

This application is a continuation application of parent application U.S. Ser. No. 10/908,287 filed on May 5, 2005 and claims priority thereto, which said parent application claims priority to U.S. Provisional Application No. 60/522,990 filed Nov. 30, 2004 and to U.S. Provisional Application No. 60/607,076 filed Sep. 3, 2004. The parent application and both provisional applications are hereby incorporated by reference in their entireties to the fullest allowable extent.

STATEMENT REGARDING FEDERALLY SPONSORED RESEARCH OR DEVELOPMENT

Not applicable.

TECHNICAL FIELD

Embodiments of the invention generally relate to optical image acquisition and processing apparatus and methods. More particularly, embodiments of the invention are directed to apparatus and methods for providing an image of an object that records a greater or an extended depth of field than provided by a typical diffraction-limited optical imaging system. Particularly advantageous fields for application of the embodiments of the invention include, but are not limited to, photography, digital imaging, communications and entertainment, pattern recognition, detection, microscopy, machine vision, and optical measurement.

BACKGROUND OF THE INVENTION

The recorded image of an object imaged by conventional imaging system is typically sharply in focus only over a limited object distance range (in front of and behind the object) known as the 'depth of field' (DOF). The DOF is inversely proportional to the square of the numerical aperture of the imaging system for diffraction-limited imaging. On the flip-side, the 'depth of focus' is the amount by which the image may be shifted in a longitudinal direction and introduce no more than acceptable blur. Present-day cameras have mechanical focusing means (including automatic systems), to provide high quality images of particular object scenes at various object distances. Even with these focusing means it can be difficult to sharply photograph object scenes that span large axial distances (i.e., those exceeding the DOF of the optical system). Cameras with a larger depth of focus will provide better imaging performance over those without with respect to depth of field.

Digital processing of image data on a pixel-by-pixel basis has afforded more opportunity for improving and correcting optically imaged scenes. Some of these improvements have related to increasing the depth of field in the recorded image. For example, digital processing has been used to combine images of the same scene taken at different depths of focus to produce a composite image that has recorded an extended depth of field (or, as may be said, having an extended depth of field). The multiple images take time to collect, are difficult to process, and are generally unsatisfactory for scenes subject to change.

Amplitude attenuation filters have also been used to extend the depth of field. Typically, the attenuation filters are located in the aperture of the imaging system, leaving inner radii clear but attenuating the outer annulus. Moreover, these filters tend to introduce large amounts of light loss, which limits their applications.

More promising attempts have been made that deliberately blur an intermediate image in a systematic way so that at least some information about the imaged object is retained through a range of focus positions and a non-ideal impulse response function remains substantially invariant over the defocus range. Digital processing, which effectively deconvolutes the point spread function, restores the image to a more recognizable likeness of the object through an extended depth of field.

One such example locates a cubic phase mask within the aperture of the imaging system to generate a distance invariant transfer function. Digital processing removes the blur. Although significant improvement in the recorded depth of field is achieved, the cubic phase mask is not rotationally symmetric and has proven to be expensive and difficult to fabricate.

Another such example similarly locates a circularly symmetric, logarithmic asphere lens to extend the depth of field. Although this solution is more economical to manufacture, the impulse response has not been found to be substantially uniform over the full range of operation and, as a result, some degradation is experienced in the image quality of the recovered image.

Reconstruction algorithms for removing the blur of such intermediate images are subject to problems relating to the quality and efficiency of their results. Nonlinear processing algorithms can suffer from slow convergence or stagnation and produce images with reduced contrast at high spatial frequencies.

In view of the aforementioned challenges and shortcomings associated with conventional extended depth of field imaging apparatus and processes, and others appreciated by those skilled in the art, the inventors have recognized the unfilled need for apparatus and methods that are better capable of, and cost effective at, providing better images that exhibit extended depths of field.

SUMMARY OF THE INVENTION

An embodiment of the invention is directed to an imaging system that produces images recorded with an extended depth of field (i.e., exhibiting a depth of field that is greater than, or extended, over that obtainable with a typical diffraction-limited imaging system). In an exemplary aspect, the system is referred to as an integrated computational imaging system. According to an aspect, the imaging system incorporates a multifocal imaging subsystem that provides purposefully blurred intermediate images of the object scene. As used herein, the term 'multifocal' refers to a circularly symmetric optical element (e.g., lens) in which the focal length of the lens changes (either increasing or decreasing) as a function of lens radius, without any angular variation of focal length. Imaging lenses with spherical aberration are an example of a component of a multifocal imaging subsystem where the focal length varies with radius.

According to an aspect of the invention, a multifocal imaging subsystem comprising one or more components is designed to provide a controlled amount of spherical aberration to purposefully and uniformly blur the image (i.e., an intermediate image that will be subject to image processing according to an embodiment of the invention described further below) over a range of focal distances. Advantageously, the introduction of the controlled amount of spherical aberration produces a substantially uniform impulse response over the range of focal depths provided by the multifocal imaging subsystem. According to an aspect, third-order spherical aberration is the primary aberration used to purposefully blur the image. According to an aspect, the multifocal imaging subsystem has a centrally obscured aperture that shapes the system's impulse response and eliminates contrast inversion for larger amounts of defocus. Together, the controlled spherical aberration and the centrally obscured aperture provide a sufficiently narrow and invariant impulse response over an extended depth of focus. Diffraction-limited performance over a range of six to 10 times the classical depth of focus limit has been demonstrated. A digital processing subsystem is provided, which recovers the intermediate convoluted images for producing a final image of the object that remains in focus through an extended range of object depths.

In an illustrative aspect, the centrally obscured aperture of the multifocal imaging subsystem is circularly symmetric and has a minimum radius, δR. The radius δR defines both an outer limit of the central obscuration and an inner limit of a transmitting aperture having a maximum radius, R, defining an outer limit of the transmitting aperture. In an advantageous aspect, the ratio of δR/R will be greater than or equal to ⅙. In an exemplary aspect, improved performance was demonstrated for δR/R equal to or greater than 0.3.

However, for use in particular applications (e.g., mobile telephone), the one or more lenses of the multifocal imaging subsystem may be relatively small in diameter, for example, about 3 millimeters (mm) or less. When the lenses are in this size range or the optical design positions the central obscuration on an internal element surface, optical as well as physical challenges make it difficult to satisfy the condition of δR/R greater than or equal to ⅙. In this regime, other factors such as internal scattering, for example, will compromise overall system performance. Thus for values of δR/R less than ⅙, it is advantageous not to incorporate the central obscuration or, in other words, δR equals zero in this alternative aspect.

The overall aberration of the multifocal imaging subsystem can be expressed as a phase delay function in nominal wavelengths of imaging light, and the predominately third-order spherical aberration advantageously contributes a phase delay of between 1.6λ and 6λ.

According to an exemplary aspect, at least one lens of the multifocal imaging subsystem can be designed substantially free of spherical aberration, and a phase plate, for example, can be designed to produce the spherical aberration that forms the dominant feature of the purposeful blur. The phase plate may be positioned in an aperture within the multifocal imaging subsystem at the aperture stop (pupil) of the subsystem for optimum field of view. Alternatively, the multifocal imaging subsystem can include at least one lens element having a surface modified to produce some or all of the spherical aberration that forms the dominant feature of the purposeful blur and that is in a proper range for reducing impulse response variation over the extended depth of field. The spherical aberration can also be divided among more than one lens element to increase design flexibility. In a particular aspect, the phase delays produced within the aperture at δR and R may be at least approximately equal for the center of the designated object range.

Thus, in a particular embodiment, an integrated computational imaging system for producing an image of an object over an extended depth of field includes a multifocal imaging subsystem that introduces a controlled amount of predominately third-order spherical aberration to provide a purposefully blurred intermediate image through an extended range of object distances; an intermediate image-detector; and, a computer processing device that calculates a high quality image from the purposefully blurred intermediate image.

An embodiment of the invention is directed to a method of providing a higher-quality image of an object recorded over an extended depth of field than provided by a typical imaging system. The method involves the steps of providing a multifocal imaging subsystem as a part of an integrated computational imaging system; forming an intermediate image of an object that is purposefully, uniformly blurred by a controlled amount of predominately third-order spherical aberration over a range of focal distances, such that the system impulse response is substantially invariant over the focal range of the multifocal imaging subsystem; and, recovering an image from the blurred intermediate image for viewing or further application.

The range of object distances over which the intermediate image is purposefully blurred by the controlled amount of spherical aberration advantageously includes the given object distance; i.e., for object distances between the imaging system and the object and, alternatively, extending beyond the object. This extended depth of field provides depth of focus that may be four times or greater than that provided by a diffraction-limited imaging system.

In an exemplary aspect, an integrated computational imaging system in accordance with the invention includes a multifocal imaging subsystem for producing an intermediate image of an object that includes an ideal imaging component and a prescribed spherical aberration component for purposefully blurring the intermediate image. A central obscuration of the multifocal imaging subsystem renders the point spread function of object points produced with the purposeful blur substantially uniform over a range of object distances. A digital processing subsystem deblurs the intermediate image produced by the multifocal imaging subsystem and calculates a recovered image that exhibits an extended depth of field.

Each of the point spread functions of the object points has a central peak and oscillating ring structures. The central obscuration provides for narrowing the average point spread function either for the close-in points or the distance object points, depending on the design. In particular, the central obscuration renders both the widths of the central peaks and the oscillating ring structures more uniform among the object points.

The purposeful blur of the image provided by the multifocal imaging subsystem is the starting point for rendering the point spread functions of object points more uniform over an extended range of object distances. The central obscuration advantageously removes variant components of the point spread functions produced by the purposeful blur for narrowing the central peak of the average point spread function among the object points, especially the object distance corresponding to the center section of the imaging subsystem. The digital processing subsystem calculates the recovered image based on the average point spread function. Increases in performance associated with the central obscuration are believed mainly due to the similarities of the point spread functions over the design range of object distances rather than from any direct increase of the depth of field that might otherwise accompany the use of a central obscuration in an ideal imaging system. In particular, the associated improvements in the depth of field, particularly for close-in distances, are believed mainly due to both the narrower central peak of the average point spread function and the similar oscillating ring structures of the point spread functions over the designed object range. These two factors lead to point spread functions that vary less with object distance, so that the average point spread function used in the digital processing can provide a significantly improved output.

An exemplary multifocal imaging system having an extended depth of field includes a multiple lens element imaging subsystem that purposefully blurs an intermediate image with a controlled amount of a third-order spherical aberration. The third-order spherical aberration is distributed among a plurality of the lens elements and is the dominant monochromatic aberration of the system. In an aspect, a central obscuration cooperates with the third-order spherical aberration for reducing variation in the purposeful blur over the extended depth of field. The plurality of lens elements can include at least two logarithmic aspheres. As stated herein above, the central obscuration may have a radius equal to zero and thus be absent in view of optical and mechanical considerations (i.e., when $\delta R/R < \frac{1}{6}$) that would degrade system performance more than an improvement from the central obscuration.

A method for creating an extended depth of field imaging system includes formulating an imaging system as a combination of an ideal imaging component arranged for diffraction-limited imaging and an aberration component dominated by a third-order spherical aberration. The amount of the third-order spherical aberration is determined so as to reduce variations among impulse responses over the extended depth of field. The amount of the third-order spherical aberration can be determined by adjusting the amount of third-order spherical aberration from one amount to another to identify more uniform combinations of impulse responses over the extended depth of field.

Another method in accordance with the invention for extended depth of field imaging includes providing a multifocal imaging subsystem including an ideal lens modified to incorporate a controlled amount of third-order spherical aberration. The intermediate imaging performance of the modified lens is tested over a range of focus positions. The amount of the third-order spherical aberration is adjusted for producing point spread functions that have a minimal variation over the range of focus positions. A central obscuration is advantageously incorporated into the subsystem to narrow the point-spread functions, e.g., at the close-in distances referred to as the β-design.

According to an aspect of the method, a calculated impulse response departs from an arithmetic average of the impulse responses over the range of focus positions to unevenly weight the impulse responses over the extended depth of field. The calculated impulse response is incorporated into a digital processing algorithm for deblurring the intermediate image produced by the multifocal imaging subsystem and for calculating a recovered image over the extended depth of field.

Thus a circularly symmetric, spherically aberrated, multifocal imaging subsystem with (or, with qualification, without) a centrally obscured aperture can be used in accordance with the embodiments and aspects of the invention for intermediate imaging. The resulting impulse response is sufficiently invariant over a range of object depths to support digital processing for recovering an image that remains in focus over a range of focal depths. Without too much loss in light intensity, this combined system can produce diffraction-limited resolution over an extended depth of field that may be ten times that obtained by a conventional lens system. Prior approaches to extending the depth of field have not had this capability. The embodied imaging system is also economical to manufacture, since it is circularly symmetric.

The embodied invention can also be practiced as a method of recovering an image based on an intermediate image, which includes accessing an intermediate image of a scene and performing an iterative digital deconvolution of the intermediate image using a maximum entropy algorithm. Using the maximum entropy algorithm, a new image is estimated containing a combination of directional images. These directional images are uniquely altered using a metric parameter to speed convergence toward a recovered image while avoiding points of stagnation.

The metric parameter reconciles conventional maximum entropy algorithms at metric parameter values of zero and one. Values of the metric parameter are chosen between zero and one to advantageously adjust the weight of different pixel values. In an advantageous aspect, the metric parameter has a value between 0.2 and 0.6. The appropriate choice of the metric parameter contributes to a modulation transfer function having a shape that increases contrast at high spatial frequencies approaching a Nyquist limit.

The intermediate image can be produced using a multifocal imaging system, such as an aspheric lens. Typical point spread functions of such lenses have oscillating bases, which reduce image contrast. The metric parameter is adjustable within its preferred range and significantly reduces side lobe oscillation that is seen in the blurred image.

We refer to this new form of nonlinear digital processing as "metric parameter-maximum entropy algorithm" or, the MPME algorithm, which is expected to have wide applicability to digital image processing. The attributes of rapid convergence and the avoidance of stagnation can be generally advantageous for image reconstruction, restoration, filtering, and picture processing.

BRIEF DESCRIPTION OF THE DRAWINGS

FIGS. 3A-3F are graphs depicting point spread functions of a centrally obscured β-type multifocal lens for various amounts of spherical aberration according to an illustrative aspect of the invention;

FIG. 10 is a set of images of two point objects separated by a diffraction-limited distance for an imaging subsystem having a full aperture, including: intermediate image (a) showing a diffraction-limited blurred image by an ideal lens for the point objects at the optimum object distance, intermediate images (b), (c), (d) showing blurred images by a spherically aberrated multifocal imaging subsystem for other object distances, and recovered images (e), (f), (g), (h) showing images recovered by the maximum entropy algorithm from the intermediate images (a), (b), (c), and (d), respectively, according to an illustrative aspect of the invention;

FIG. 11 is another set of images of the two point objects separated by a diffraction-limited distance for an imaging subsystem having a centrally obscured aperture, including: images (a), (b), (c), (d), and (e) formed by an ideal lens with the central obscuration at different object distances, intermediate images (f), (g), (h), (i), and (j) formed by a spherically aberrated multifocal imaging system with the central obscuration at the same object distances, and recovered images (k), (l), (m), (n), and (o) showing images recovered by the maximum entropy algorithm from the intermediate images (f) (g), (h), (i), and (j), respectively according to an illustrative aspect of the invention;

DETAILED DESCRIPTION OF EMBODIMENTS OF THE INVENTION

Our studies of circularly symmetric multifocal lenses have revealed that a controlled amount of spherical aberration provides a desirable distance-invariant blur that leads to extended depth-of-field, high-quality imaging. An advantageous embodiment of an extended depth of field imaging system includes a multifocal lens subsystem that can be based on any standard imaging arrangement modified to incorporate predominately third-order spherical aberration, as well as higher-order spherical aberrations. Such standard imaging arrangements include Petzval lenses, Cooke lenses, double Gauss lenses, zoom lenses, auto focus lenses, telescope systems, and others known in the art.

In addition, our studies have found that a further improvement in imaging, particularly at diffraction-limited resolution throughout an extended depth of field, can be realized by obscuring a center portion of the aperture of the multifocal imaging subsystem to narrow the impulse response for close-in distances (β-design) or for far distances (referred to herein as the γ-design). The central obscuration increases the range over which the impulse response remains uniform. The radially-central region of the multifocal imaging subsystem can be a major contributor to the variation in the impulse response with distance. The combination of a central obscuration with a properly designed multifocal imaging system can be used to further extend the depth of field, or to support higher resolution imaging through the extended depth of field.

Figure 1:
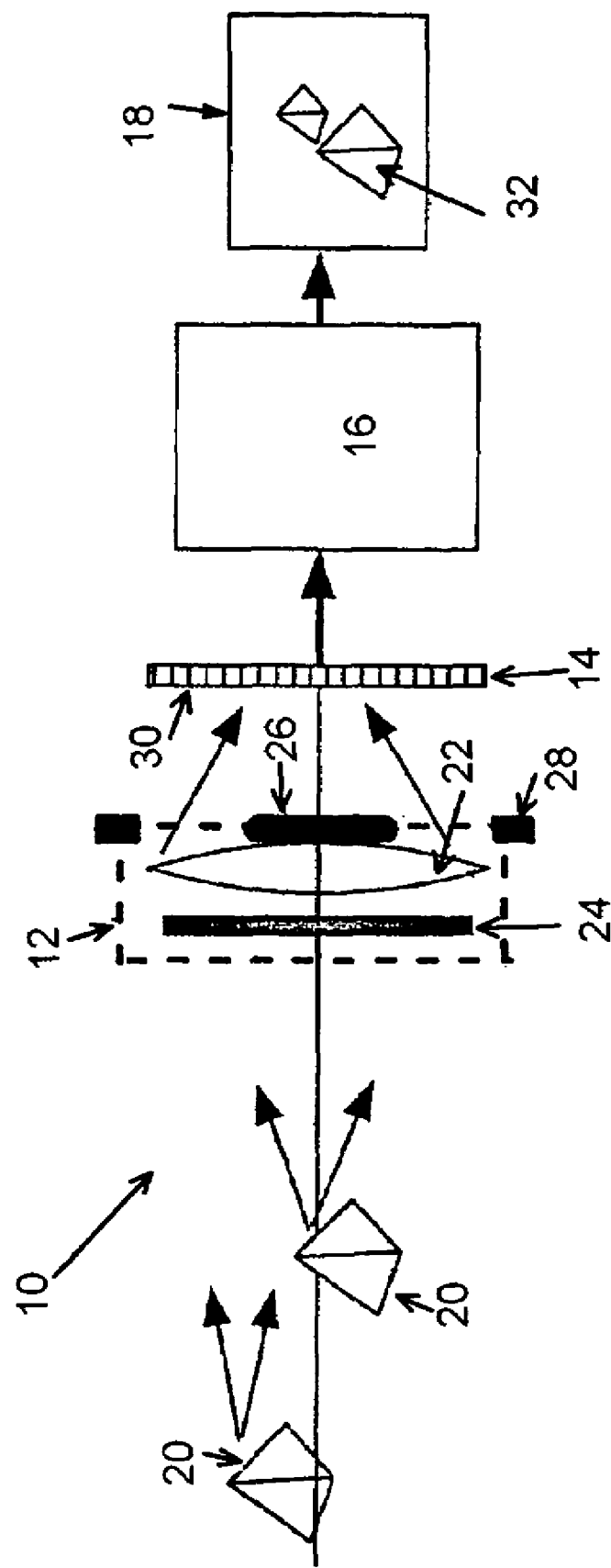
FIG. 1 is a block diagram of an integrated computational imaging system in accordance with an embodiment of the invention.

Referring to FIG. 1, an integrated computational imaging system 10 for extended depth of field imaging includes a multifocal imaging subsystem 12, an intermediate image detection device 14, a digital processing subsystem 16, and a display 18.

The multifocal imaging subsystem 12 includes a single or multiple element lens 22 and a phase plate 24. The lens 22 is a conventional lens having at least one aspherical surface arranged for ideal imaging and the phase plate 24 is arranged to contribute a predetermined amount of spherical aberration. A central obscuration 26 is located in an aperture 28 disposed in the multifocal imaging subsystem 12 for further improving performance. The phase plate 24 can be fabricated separately and aligned with the lens 22 as shown, or the optical contribution of the phase plate can be incorporated into a surface of lens 22, such as in the form of a logarithmic lens. Although both the lens 22 and the phase plate 24 are preferably transmissive, either or both of the lens 22 and the phase plate 24 can be alternatively fashioned as reflective surfaces such as in telescopic photography applications. The central obscuration 26 can also be realized in different ways, such as by adding a central stop within the aperture 28 or by arranging for an annular pattern of illumination that has center darkness. A pre-existing central stop can also be used for purposes of the invention, such as a secondary mirror of a telescope.

Other imaging systems contemplated by the invention include multiple lens elements such as for dealing with chromatic aberrations or other imaging requirements. The invention provides increased flexibility within such multiple lens element designs to distribute the desired amount of spherical aberration among a plurality of the lens elements. For example, at least two of the lens elements can be formed as logarithmic aspheres, each incorporating a portion of the desired spherical aberration.

The image detection device 14, which collects an intermediate image 30 of object 20 that is purposefully blurred, can be fashioned as a pixilated CCD (charge coupled device) or CMOS (complementary metal oxide semiconductor) detector or other light sensitive device. The detector pixels can be arranged as a two-dimensional array, as a one-dimensional array, or even as a single detector pixel. Any pixel combinations short of two dimensions are subject to scanning for collecting enough information to complete a two dimensional intermediate image 30. However, one-dimensional imaging can be used for particular applications.

The digital processing subsystem 16 includes a computer-processing device having a combination of hardware and software for the purpose of image processing. The digital processing subsystem 16 can be incorporated into a camera system that also includes the multifocal imaging subsystem 12, or the digital processing subsystem 16 can be arranged as a standalone image-processing computer. The primary purpose of the digital processing subsystem 16 is to sharpen the intermediate image 30. An inverse filter or its modifications, e.g., Wiener filter, can be used for this purpose. A nonlinear algorithm, such as an iterative maximum entropy algorithm, can be used to sharpen the intermediate image 30. If a maximum entropy algorithm is used, an optional acceleration factor, referred to herein as a metric parameter, can be chosen to optimize the speed and convergence.

The digitally processed image, which is referred to as a recovered image 32, is outputted to the display device 18, which can be a CRT (cathode ray tube), LCD (liquid crystal display) or other display device appropriate for viewing purposes. Alternatively, the display device 18 can be omitted and/or the recovered image 32 can be inputted to other functional hardware/software. For example, the recovered image 32 can be input to a pattern recognition system or a machine vision system. If the recovered image 32 is used for these latter purposes, then the digital processing subsystem can be incorporated into the pattern recognition or machine vision system. The digital processing device can become optional depending on the amount of blur in the intermediate image.

The integrated computational imaging system 10 is applicable to binary or gray scale or color imaging. It is also applicable to a range of different wavelengths including infrared imaging.

Figure 2:
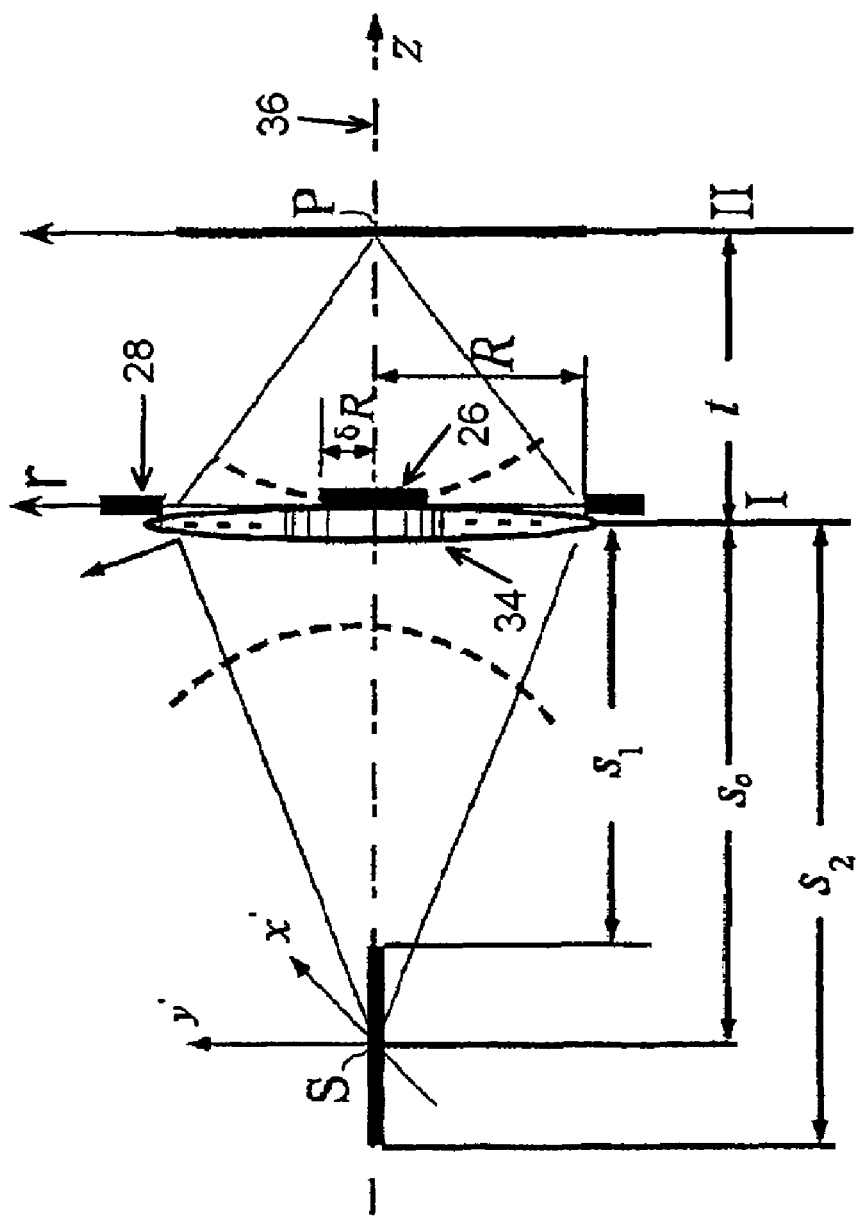
FIG. 2 is a diagram of a multifocal imaging subsystem having a centrally obscured aperture according to an exemplary aspect of the invention.
Figure 3B:
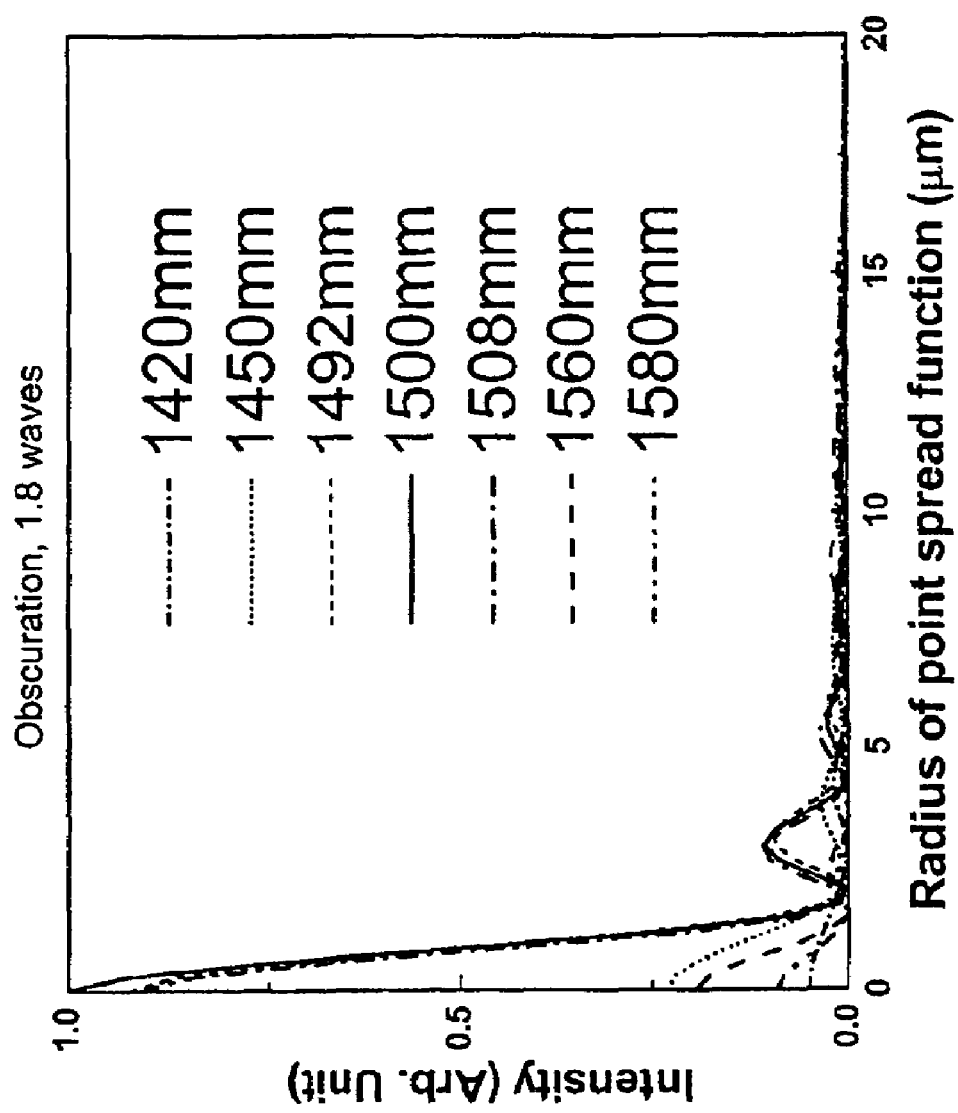
Figure 3C:
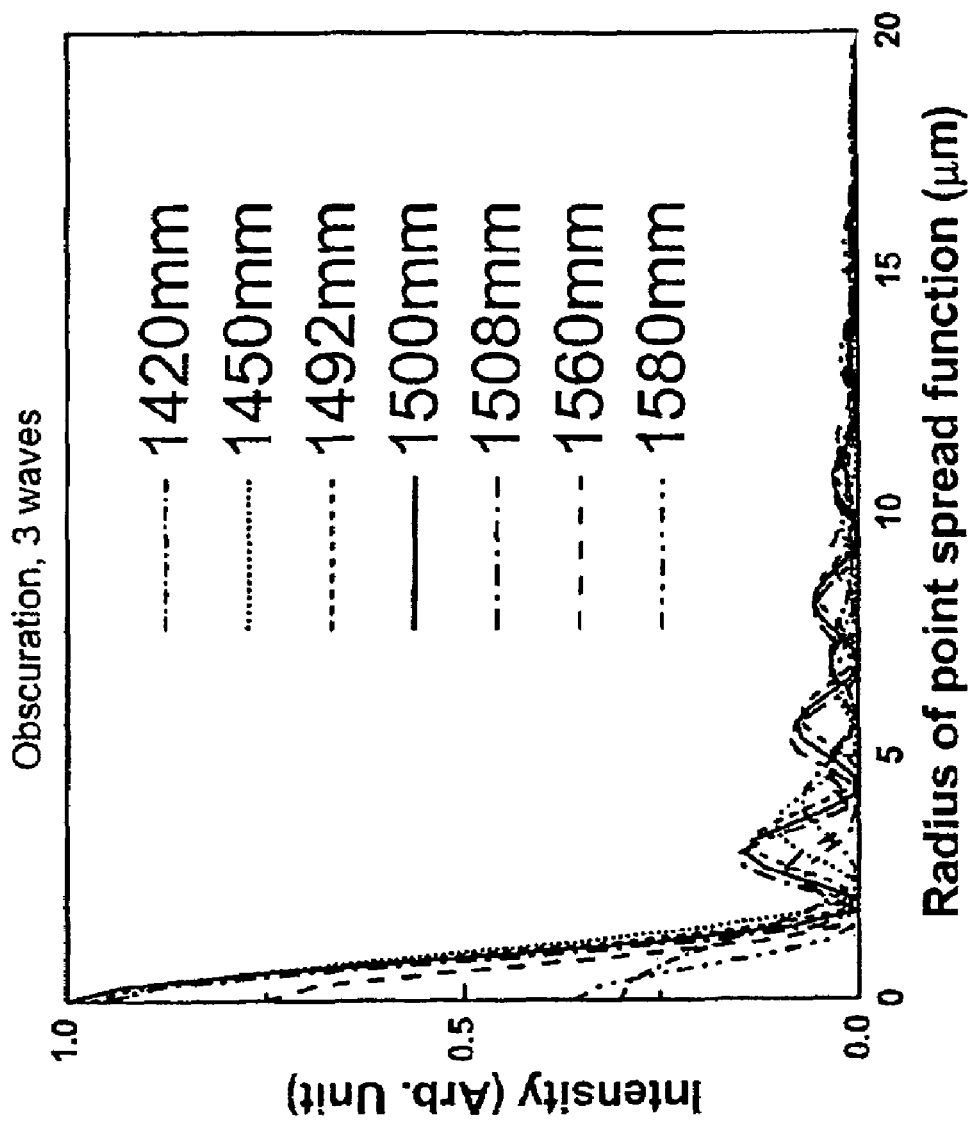
Figure 3D:
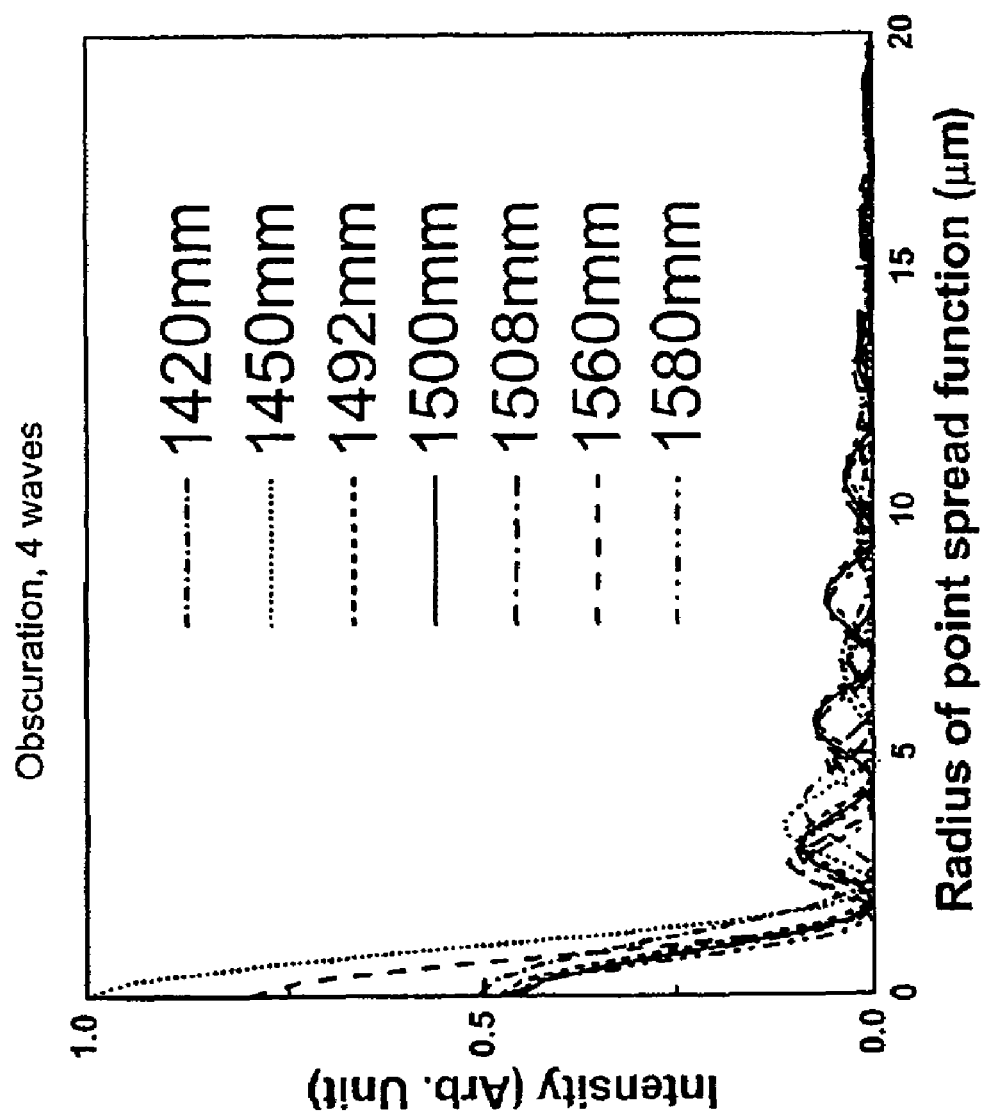
Figure 3E:
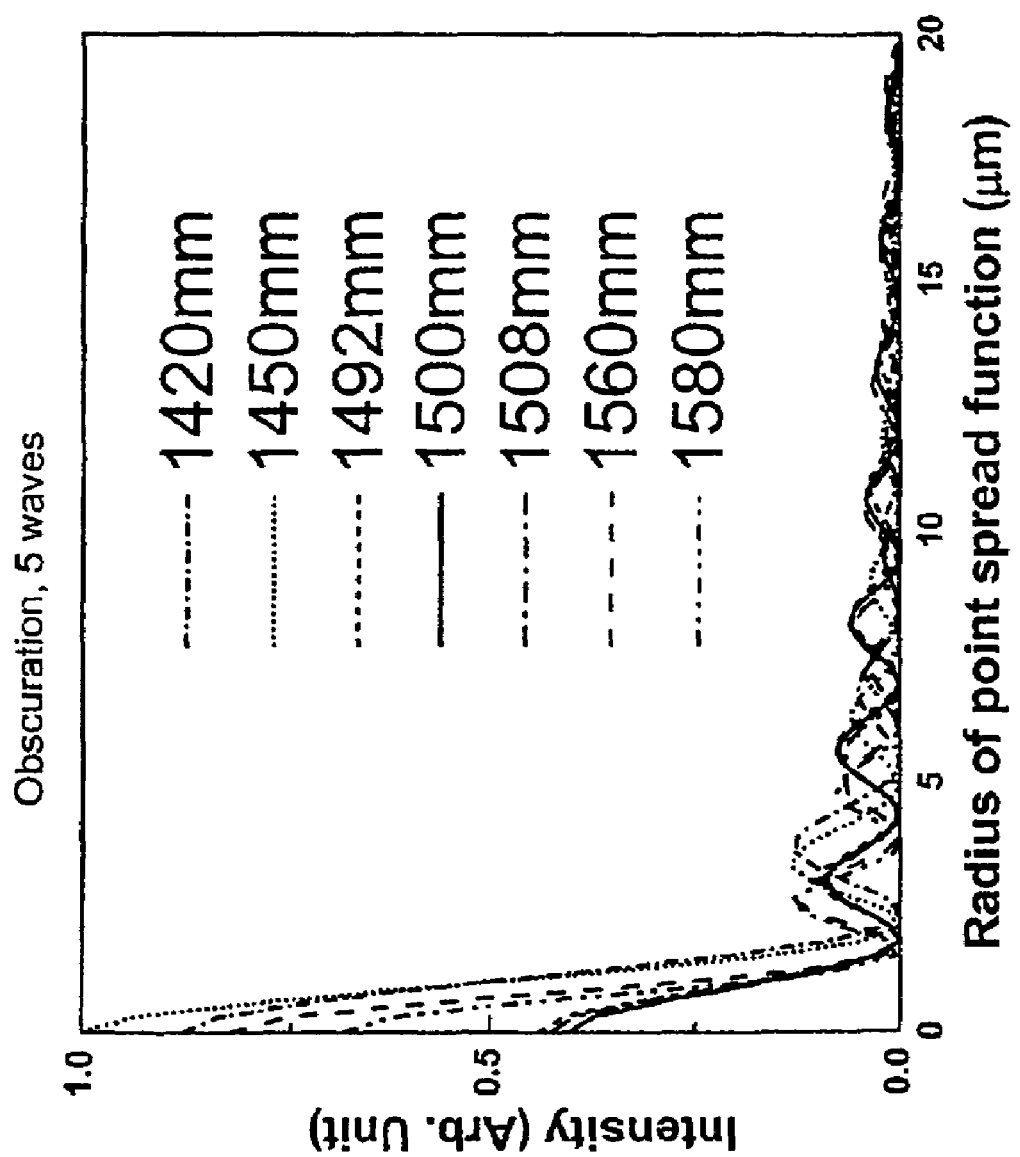
Figure 3F:
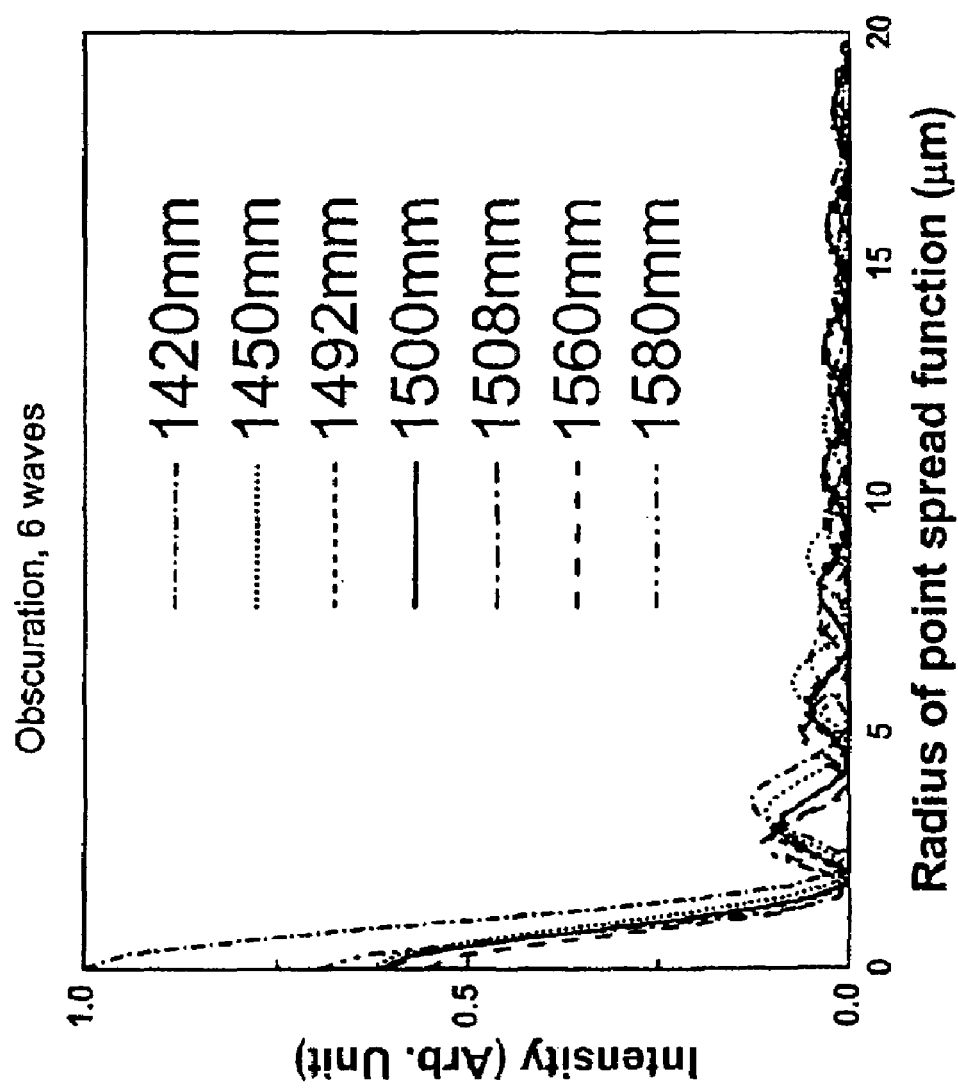
Figure 4A:
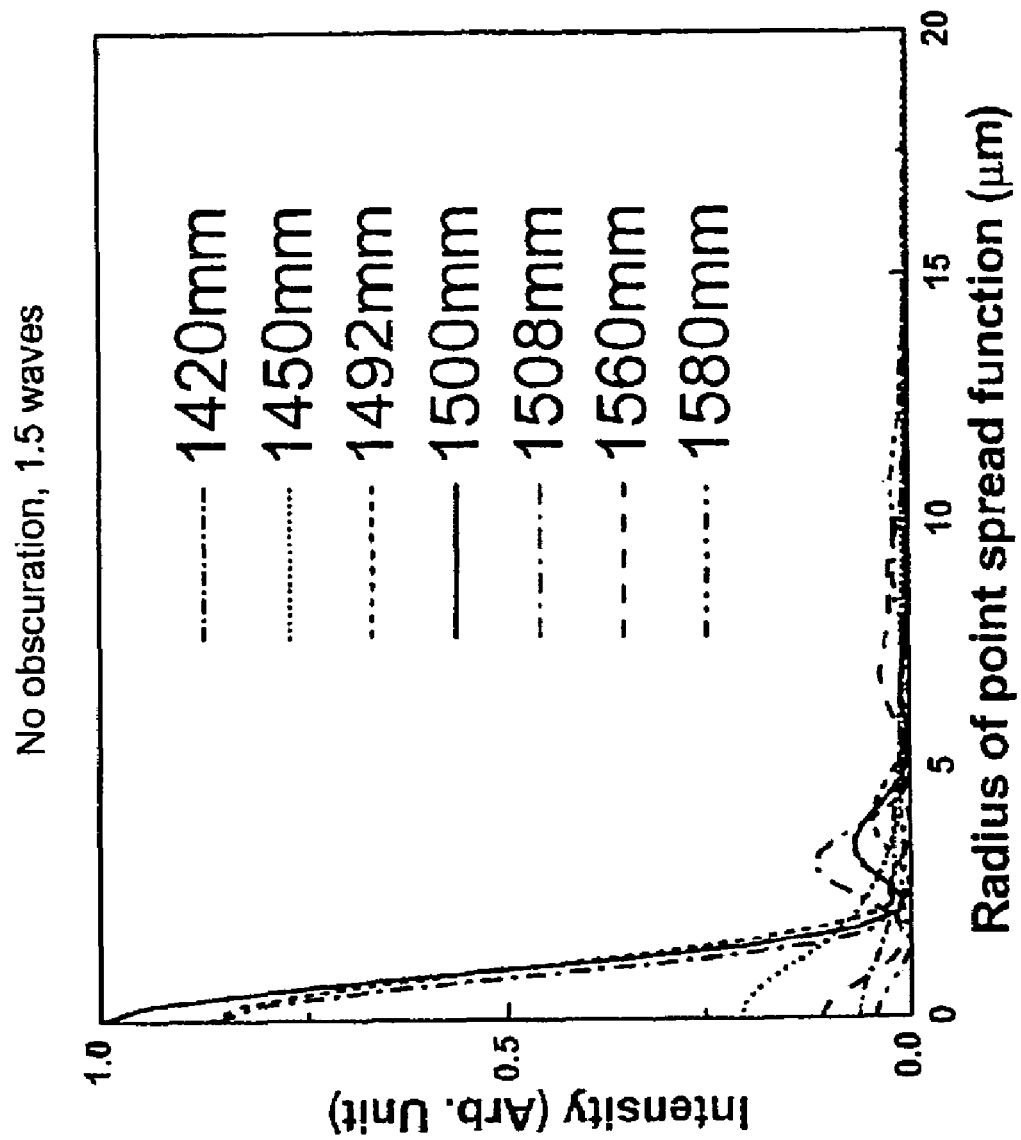
FIGS. 4A-4F are graphs depicting point spread functions of a non-centrally obscured β-type multifocal lens for various amounts of spherical aberration according to an illustrative aspect of the invention.
Figure 4B:
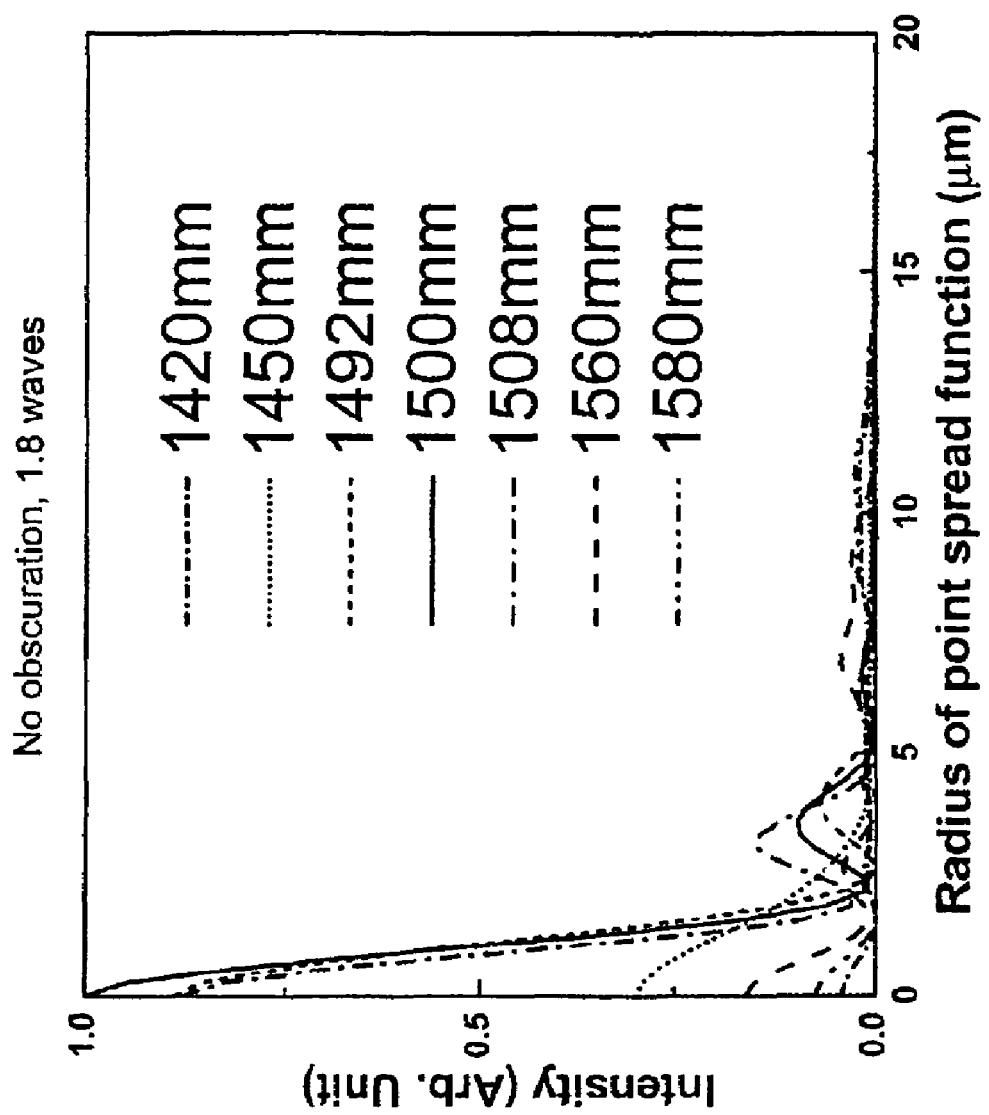
Figure 4C:
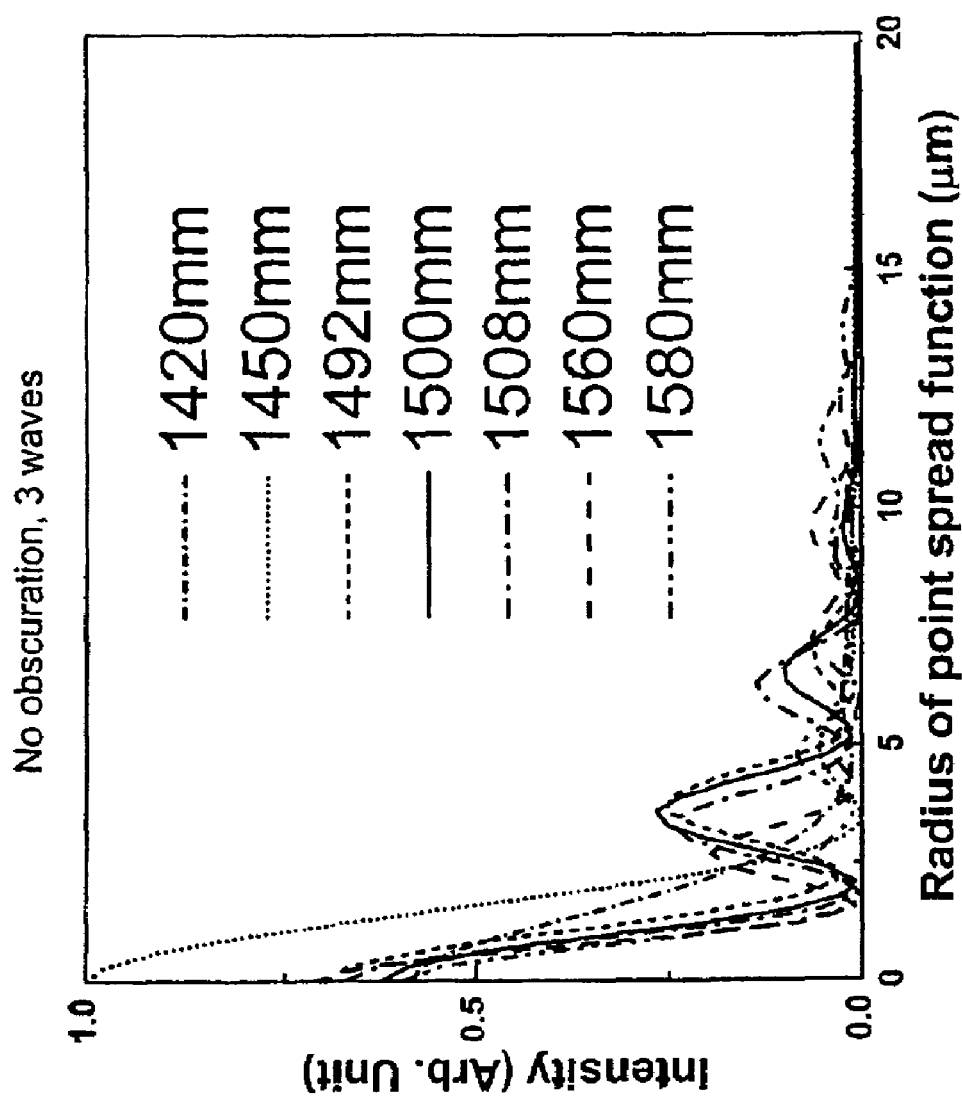
Figure 4D:
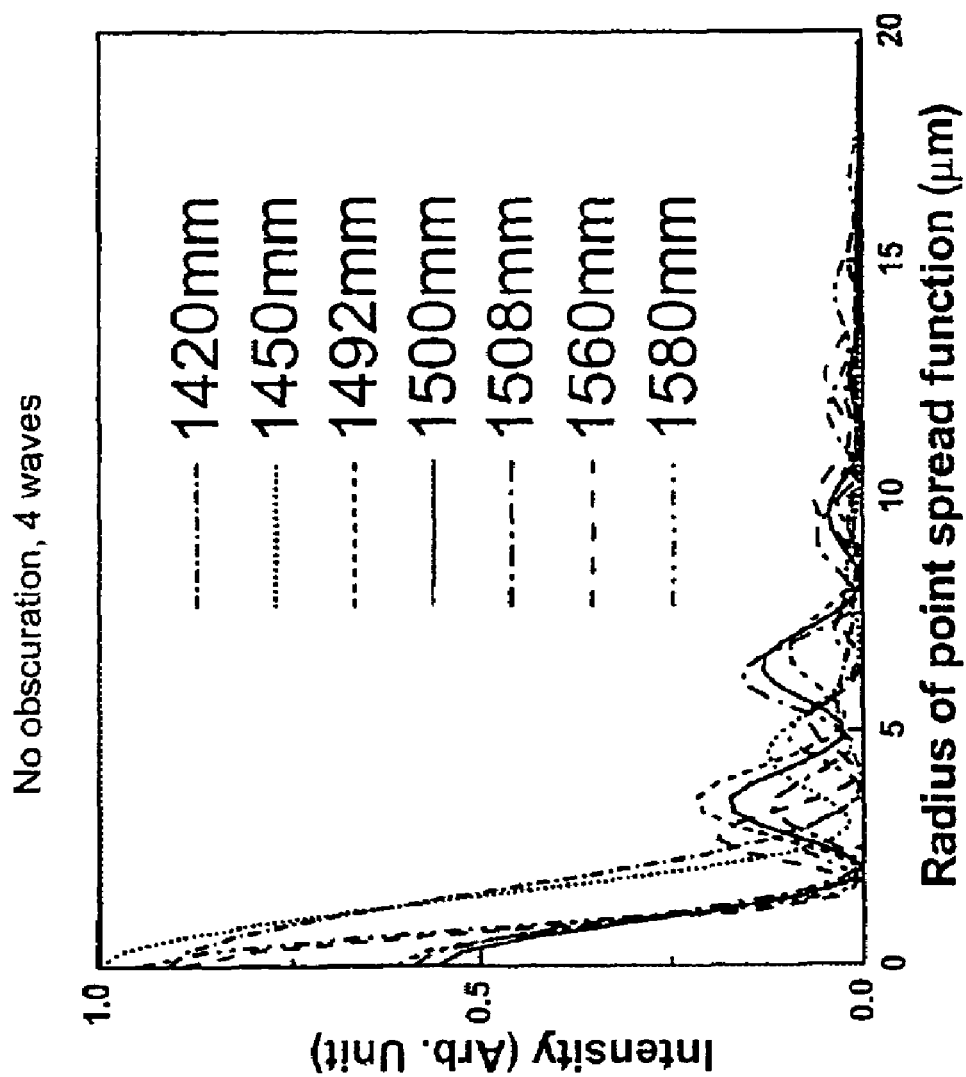
Figure 4E:
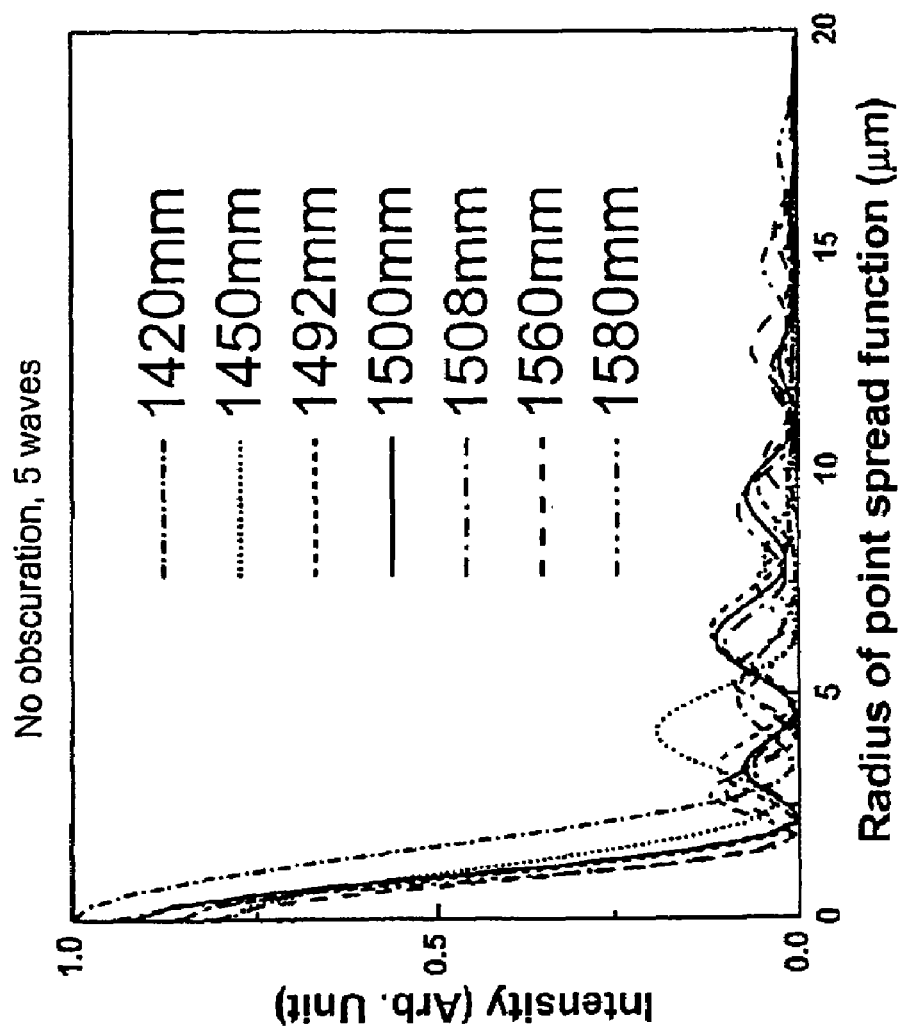
Figure 4F:
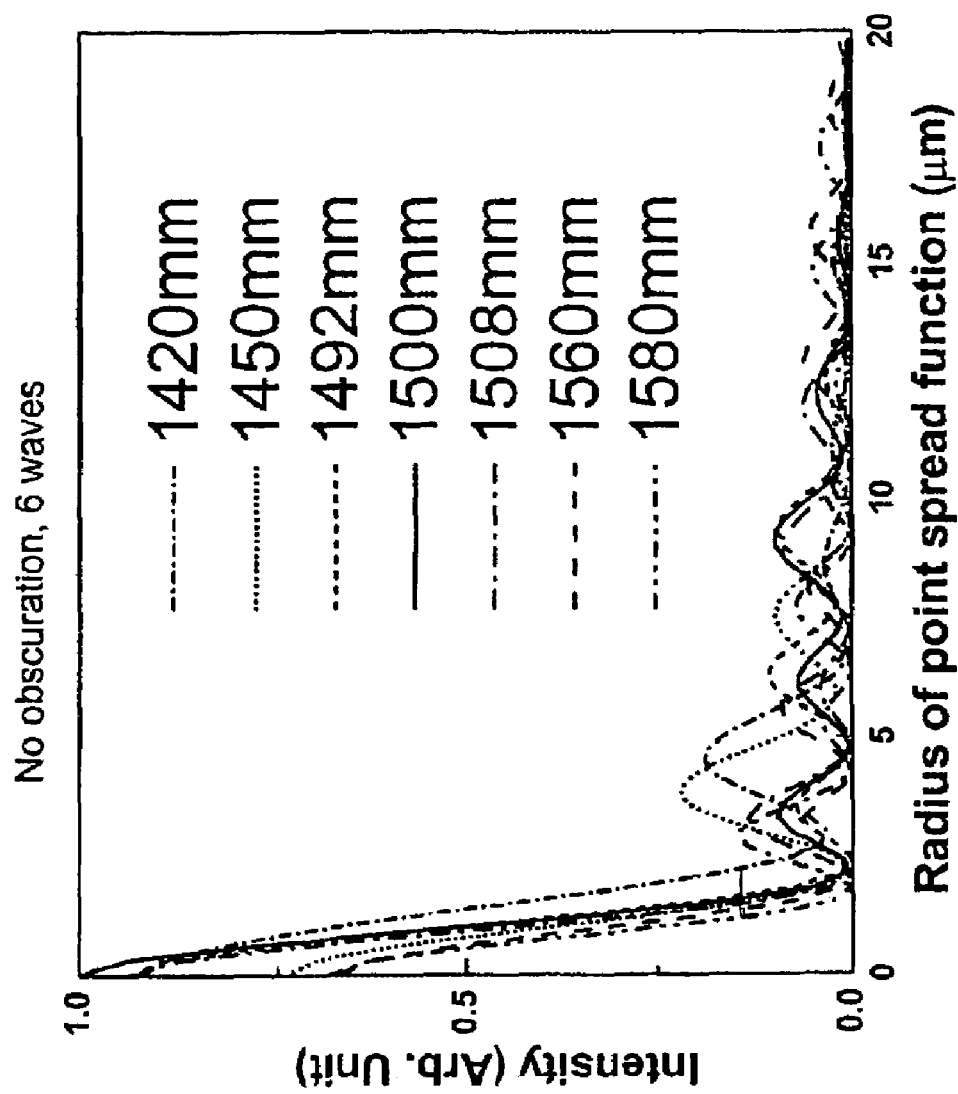
Figure 5A:
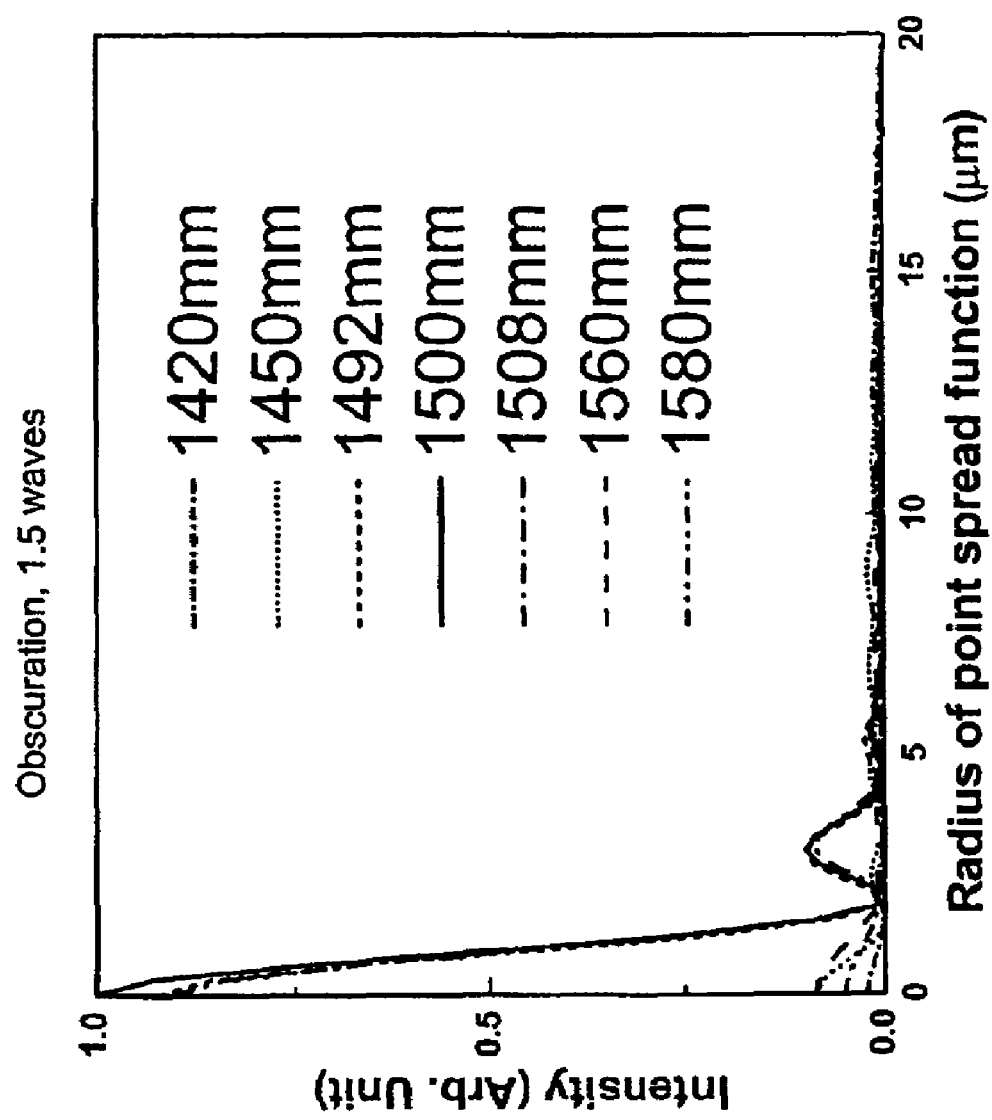
FIGS. 5A-5F are graphs depicting point spread functions of a centrally obscured γ-type multifocal lens for various amounts of spherical aberration according to an illustrative aspect of the invention.
Figure 5B:
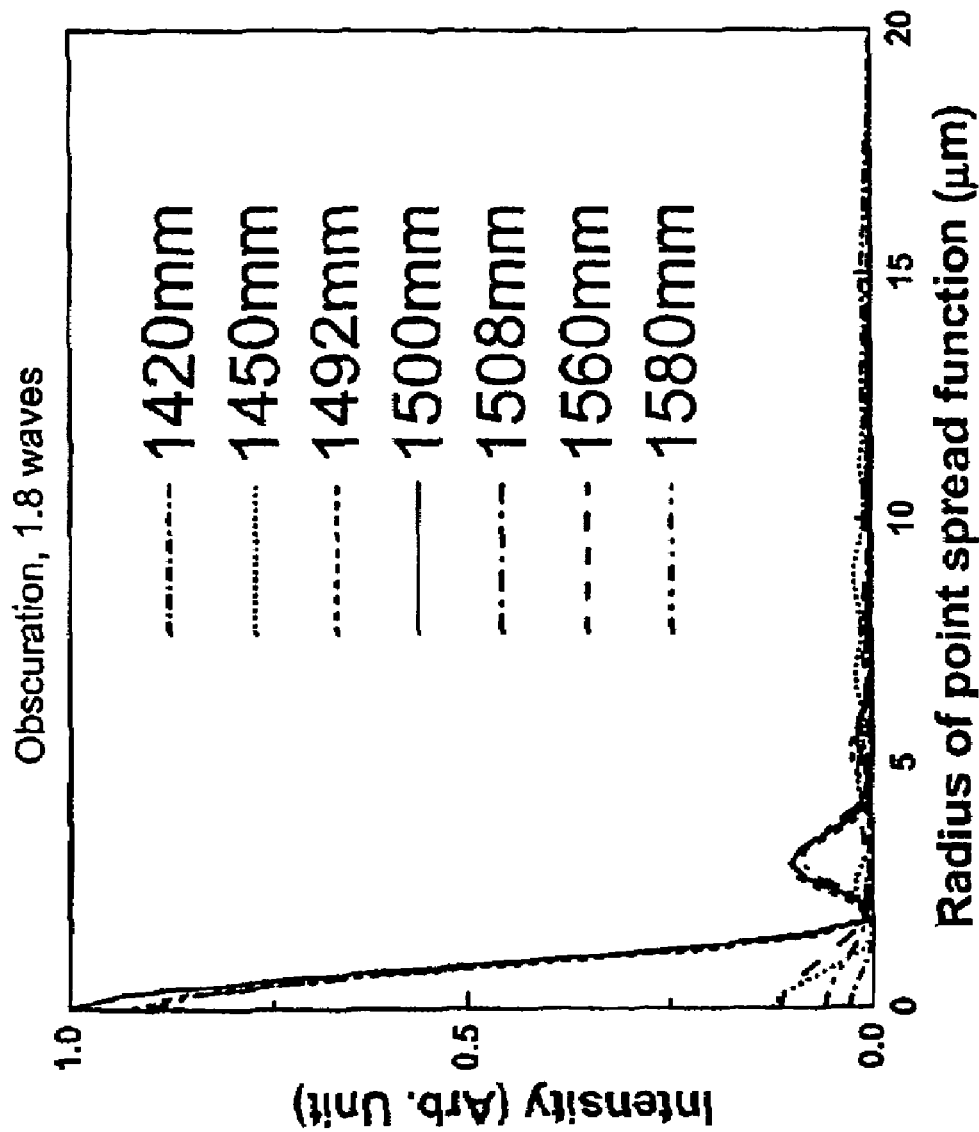
Figure 5C:
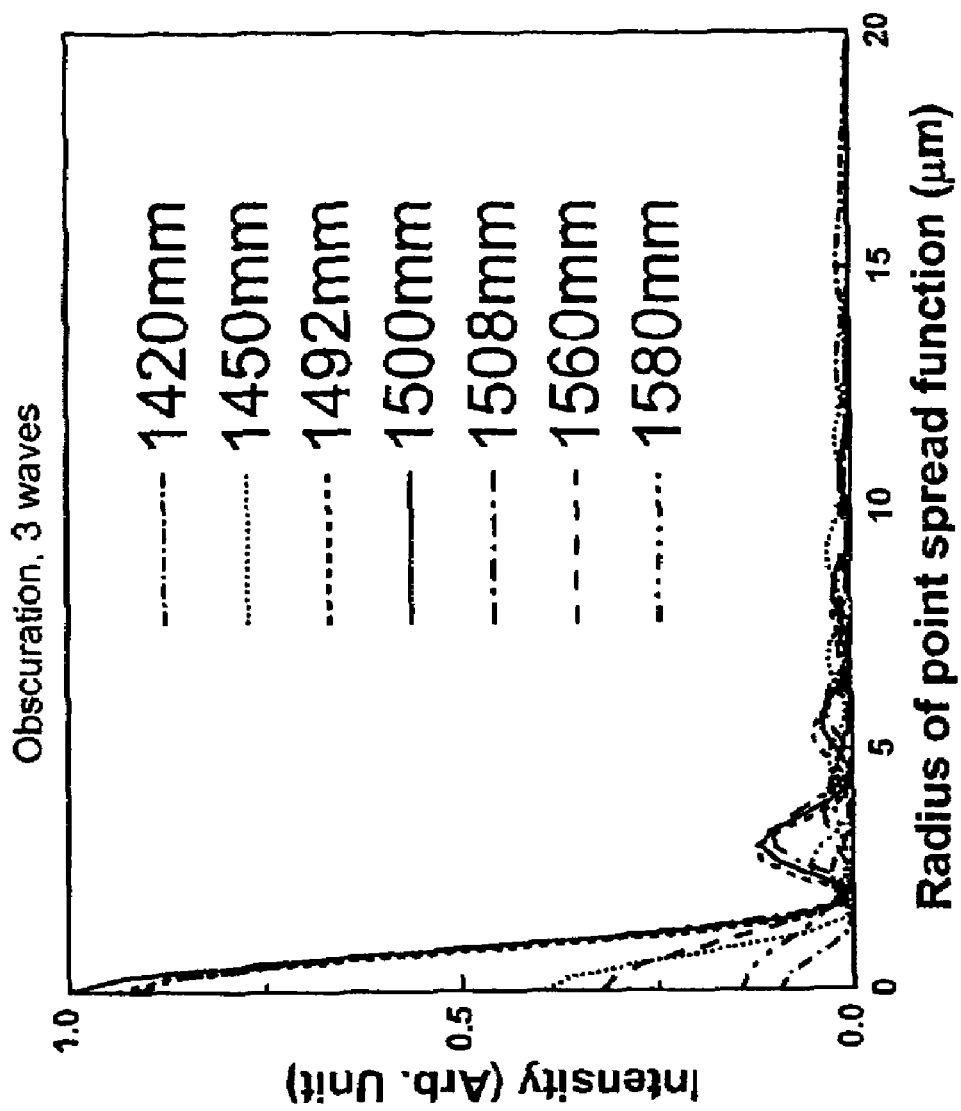
Figure 5D:
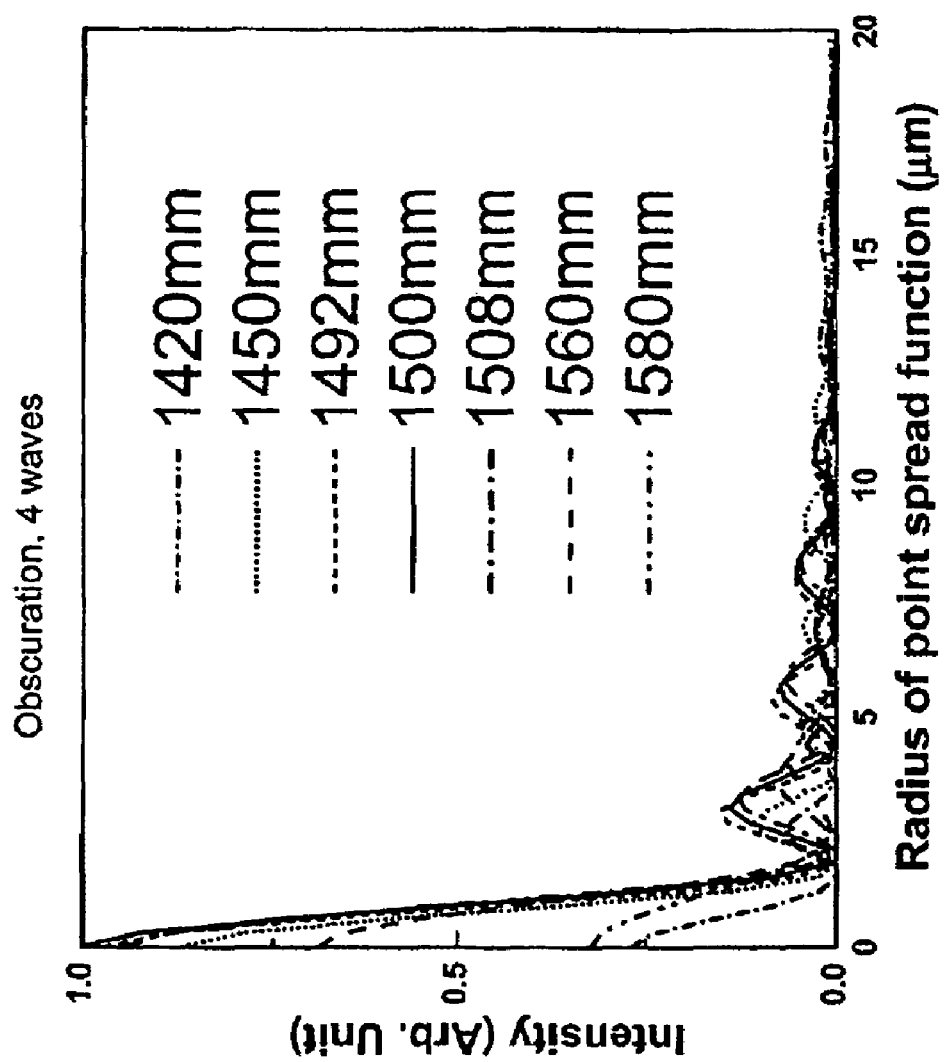
Figure 5E:
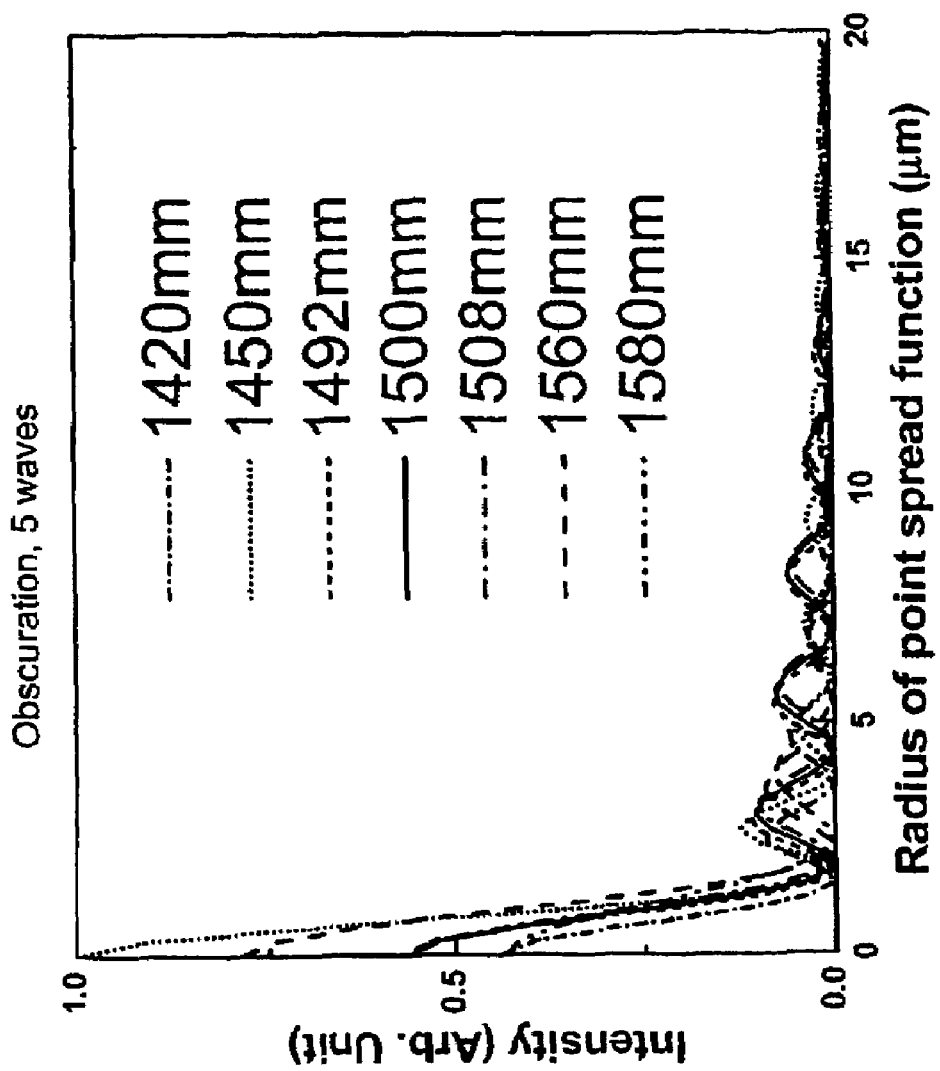
Figure 5F:
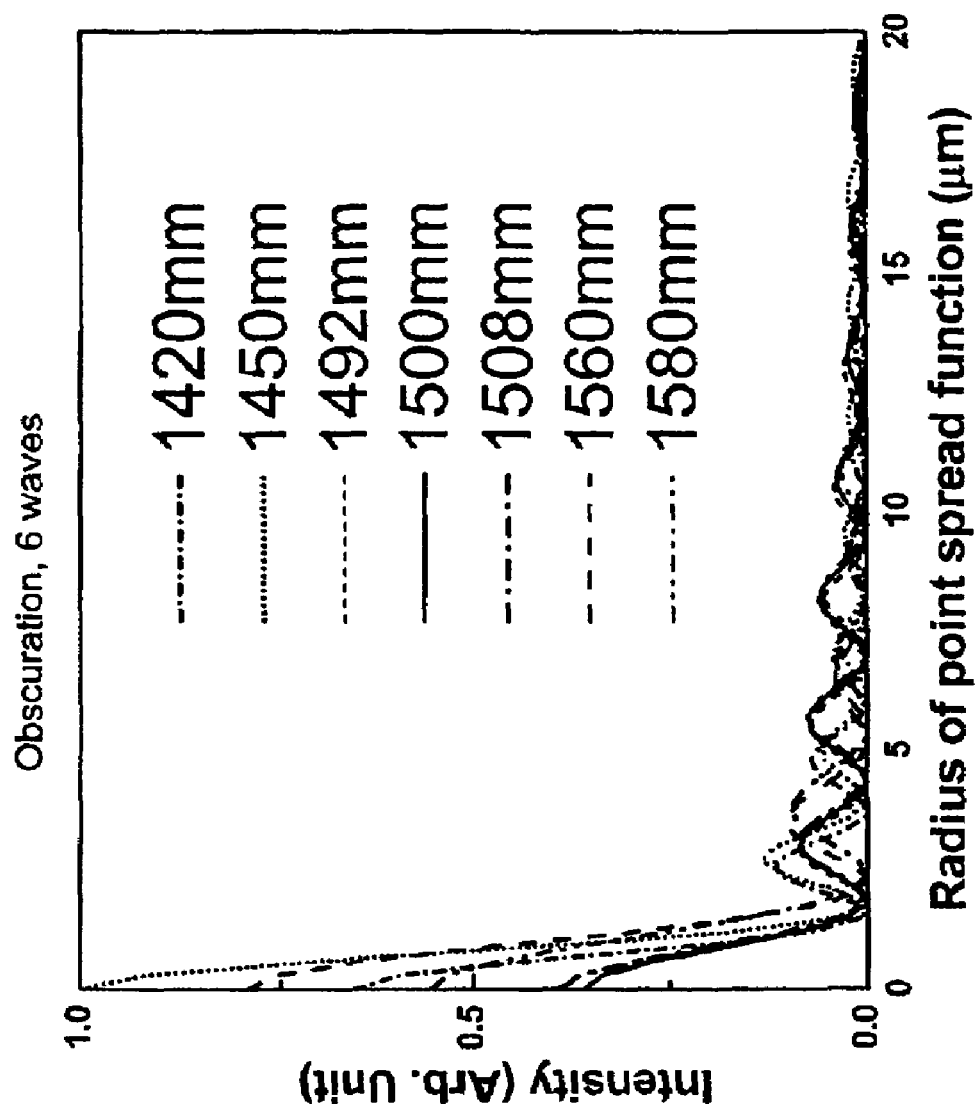
Figure 6A:
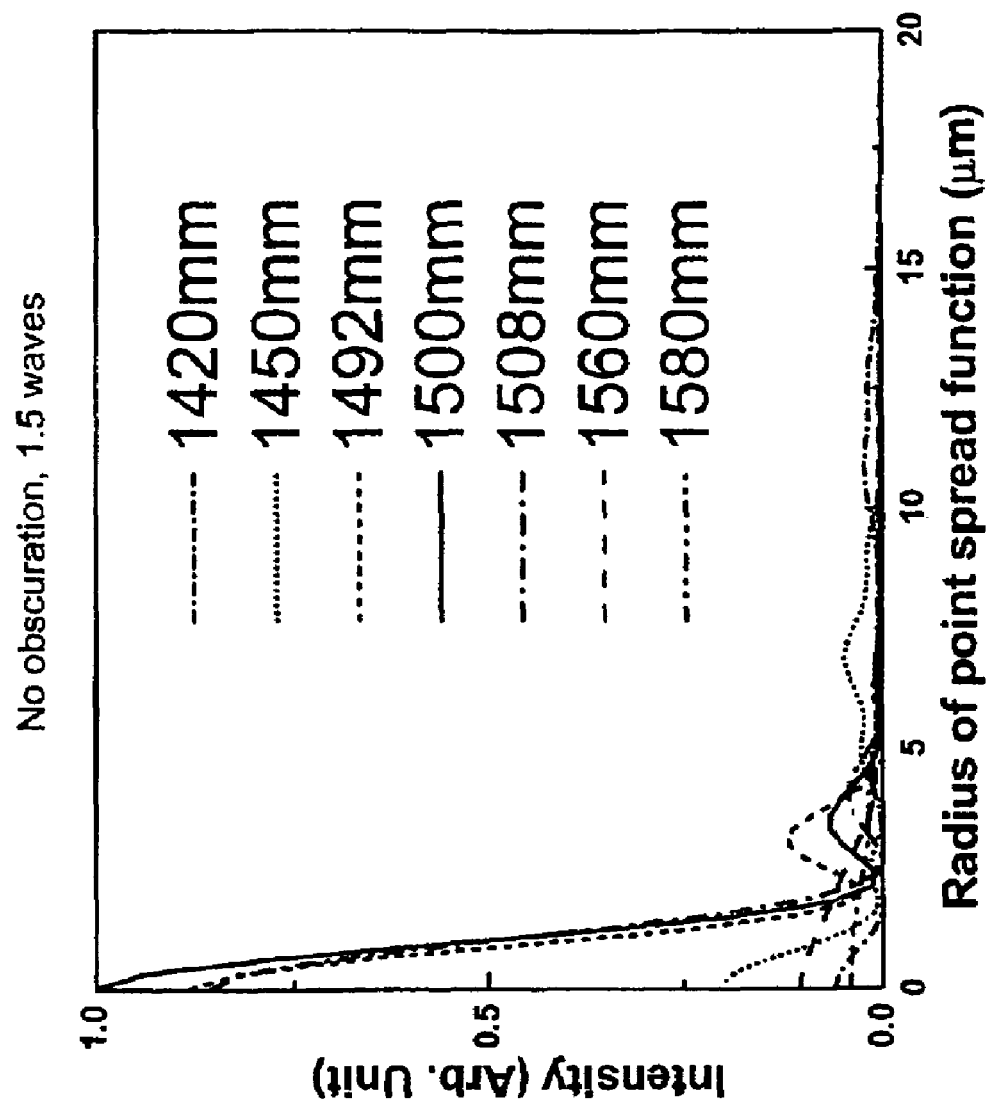
FIGS. 6A-6F are graphs depicting point spread functions of a non-centrally obscured γ-type multifocal lens for various amounts of spherical aberration according to an illustrative aspect of the invention.
Figure 6B:
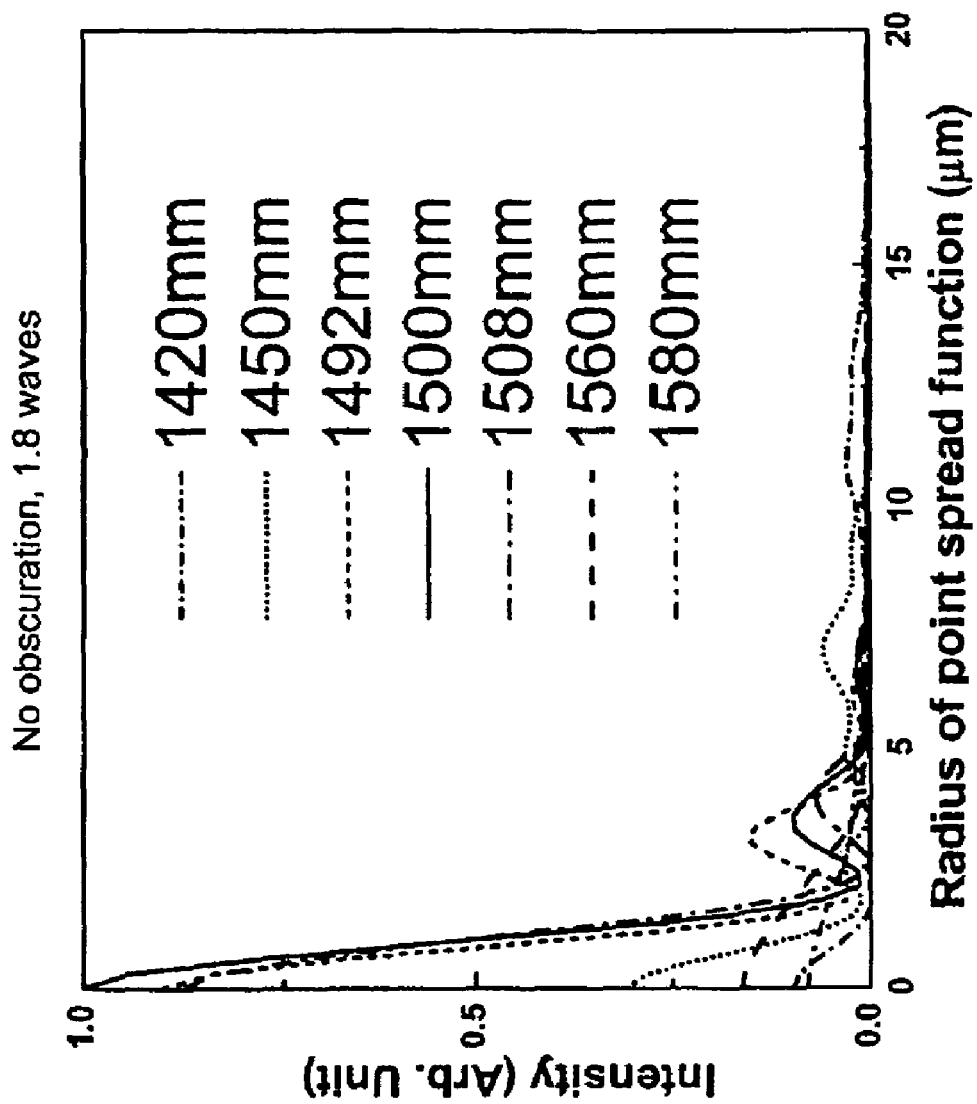
Figure 6C:
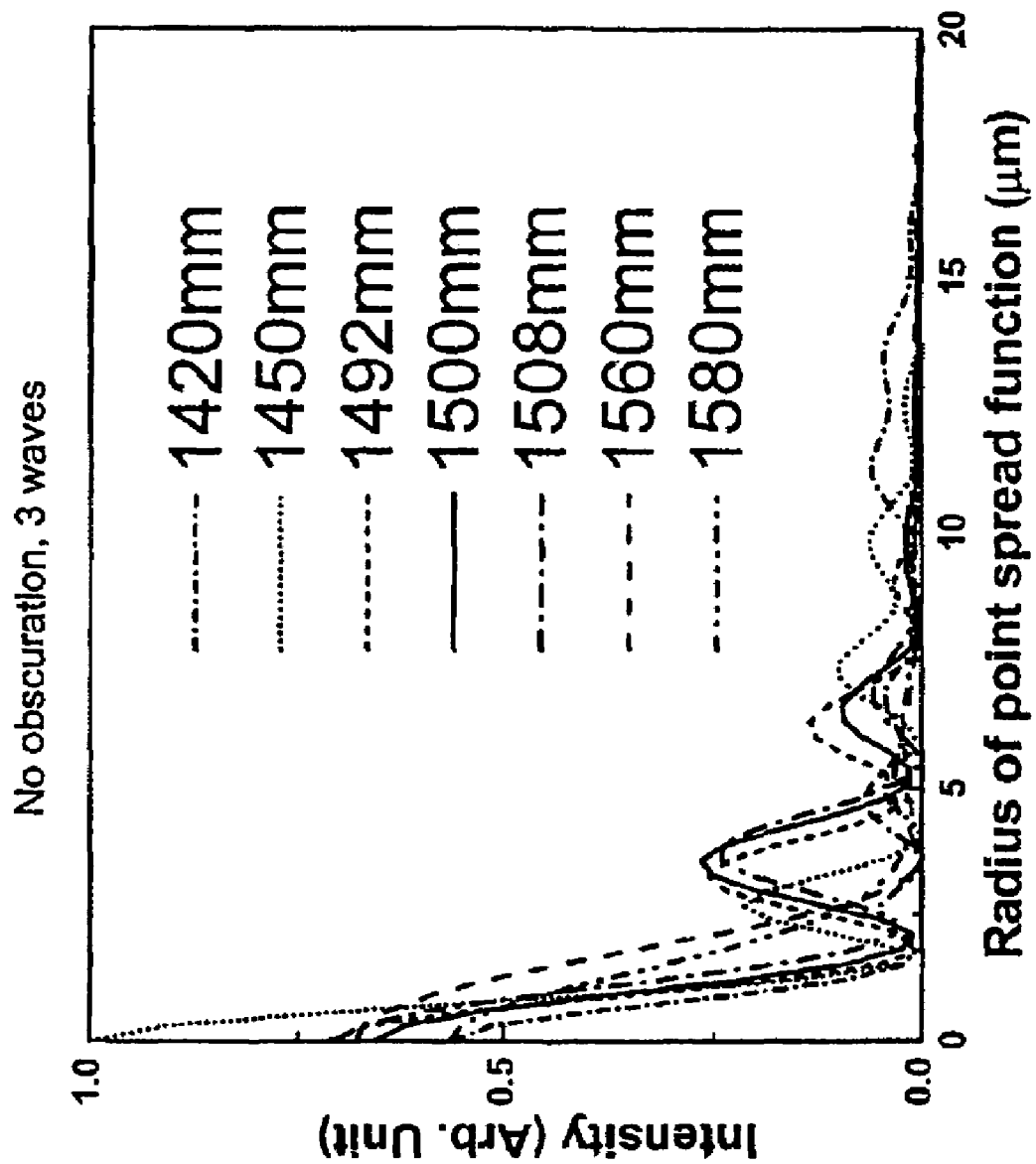
Figure 6D:
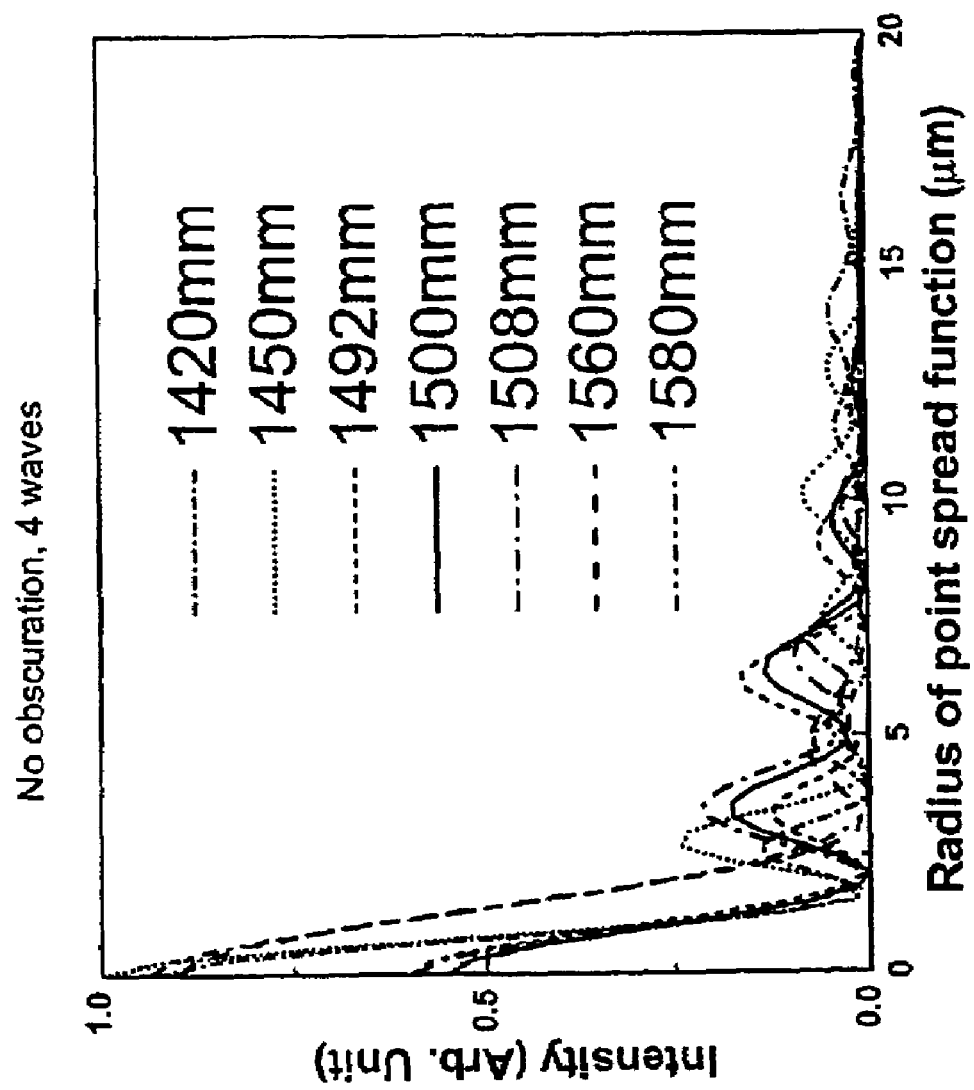
Figure 6E:
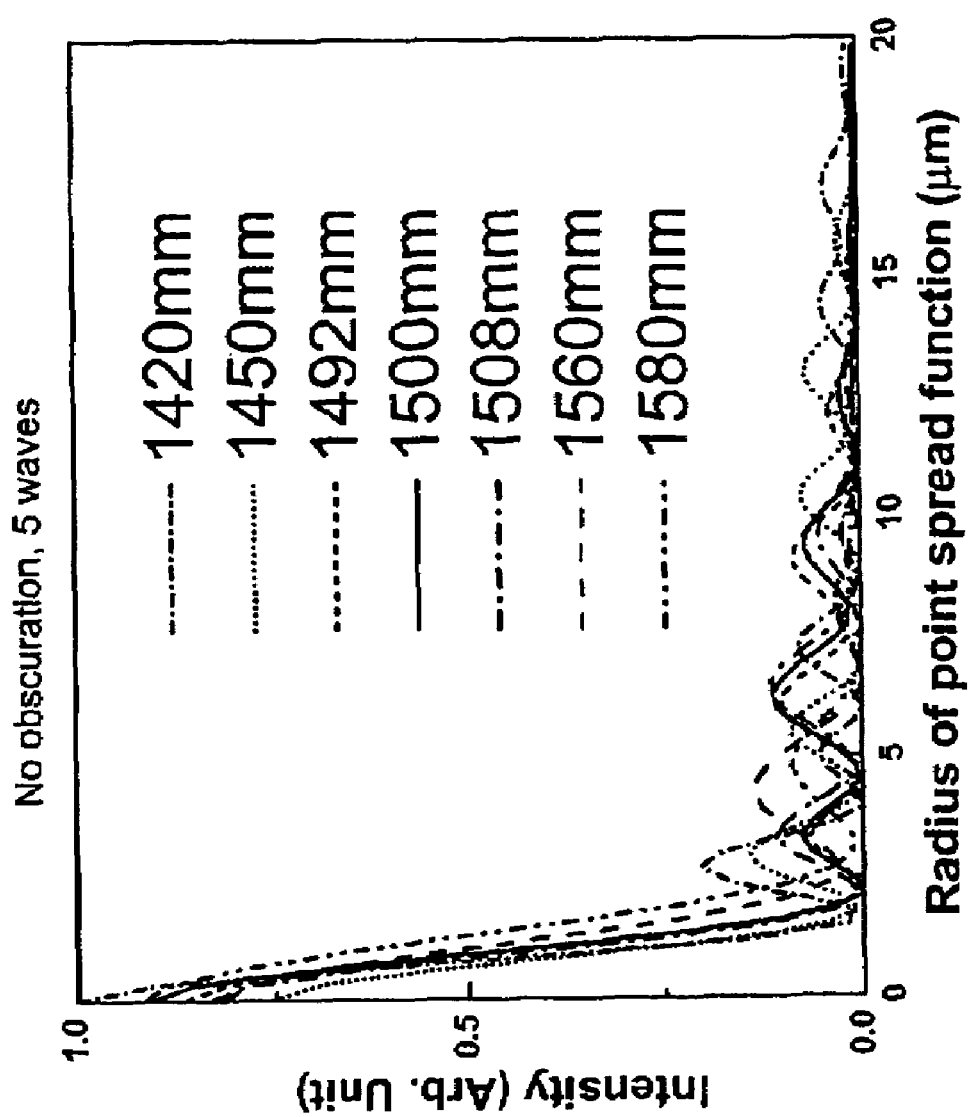
Figure 6F:
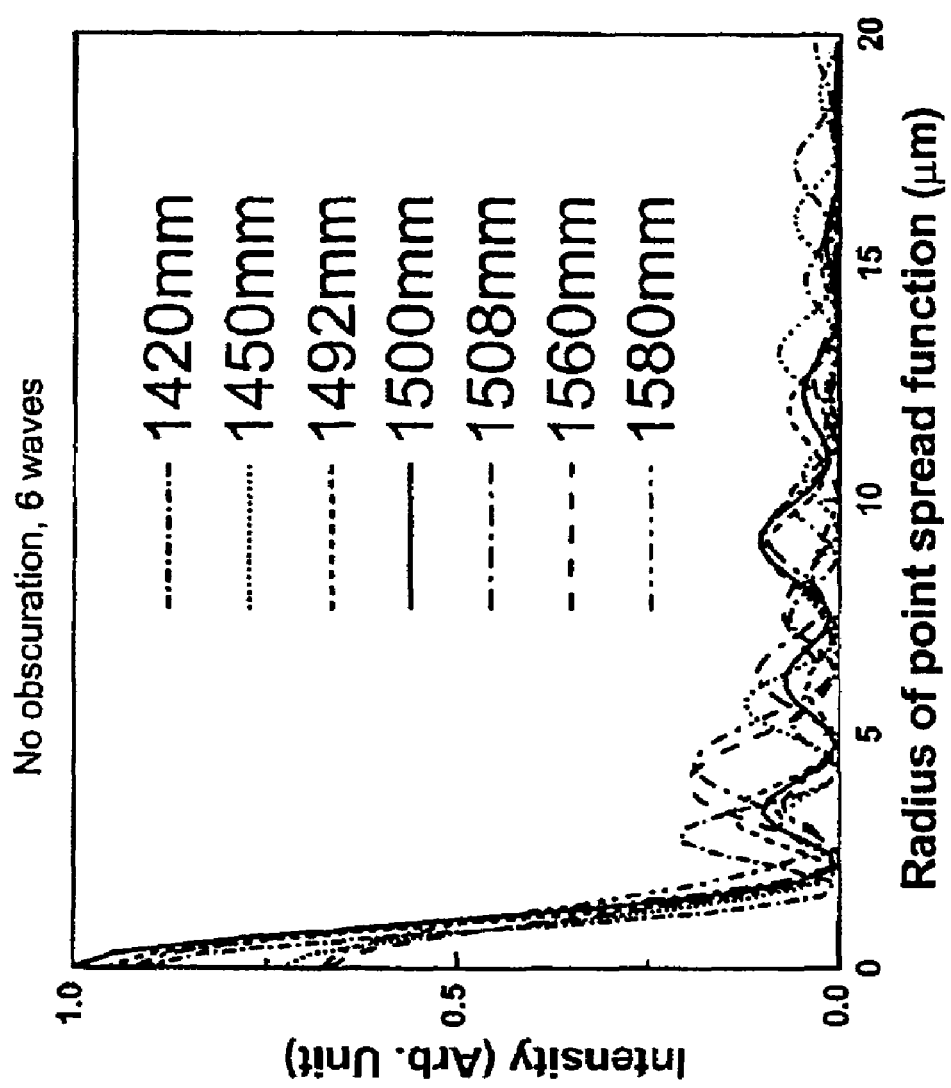

An optical diagram of a modified multifocal imaging subsystem 12 for producing the intermediate image 30 is illustrated in FIG. 2 based on use of a logarithmic asphere 34 that combines the ideal imaging of the lens 22 with a predetermined spherical aberration of the phase plate 24. A point source S, which is located along an optical axis 36 at a distance $S_0$ away from the logarithmic asphere 34 at object plane I, is imaged as a blurred intermediate point image P at image plane II at a distance t along the optical axis 36 on the other side of the logarithmic asphere 34. The logarithmic asphere 34 is mounted within the annular (or ring-type) aperture 28, having a radius from $\delta R$ to R, where $\delta R$ is the radius of the central obscuration 26 and R is the radius of lens aperture 28, where $0 \leq \delta R < R$. The center portion of the lens aperture 28 from the optical axis 36 to $\delta R$ is blocked by the central obscuration 26 in the form of a disk-shaped stop. However, $\delta R = 0$ is treated as a special case of a full aperture, which is consistent with a particular embodiment of the invention.

In optical system design, the ideal imaging components and the aberrations can be described as follows:

$$\phi/k = W + \phi_{ideal}/k \quad (1)$$

wherein the phase delay $\phi$ is measured in radians, k equals $2\pi/\lambda_0$ where $\lambda_0$ is the average wavelength of illumination, and W is the optical path difference (OPD) in micrometers.

For the ideal imaging system, it is well known that $$\phi_{ideal} = k(\sqrt{t^2 + r^2} - t + \sqrt{s_0^2 + r^2} - s_0) \quad (1)$$

in which the phase delay $\phi_{ideal}$ is measured in radians for a perfect diffraction limited lens, r is the radial coordinate in plane I, and $s_0$ is the focused object position, and $k = 2\pi/\lambda_0$.

For the ideal lens, as an example with $s_0 = 1500$ mm, $t = 62.5$ mm, $R = 8$ mm, and $\lambda_0 = 0.5$ $\mu$m, from a power series expansion of $\phi_{ideal}$, one can readily find:

$$\phi_{ideal} = 6702.07\left(\frac{r}{R}\right)^2 - 26.35\left(\frac{r}{R}\right)^4 + 0.21\left(\frac{r}{R}\right)^6 + \ldots \quad (3)$$

which Equation (3) is valid in the non-paraxial regime.

For the OPD W, of the two types of logarithmic aspheres denoted by subscript $\beta$ and subscript $\gamma$, one can express them as follows:

$$W = \sqrt{s_0^2 + r^2} - s_0 + \frac{\lambda_0}{2\pi}\phi_P \quad (4)$$

where $s_0$ is the center of the depth of field range, $\lambda_0$ is the wavelength of illumination in vacuum, and the expression of $\phi_P$ for the two types of logarithmic aspheres, $\phi_{P\beta}$ and $\phi_{P\gamma}$, can be written as follows.

$$\phi_{P\beta}(\rho) = a_\beta \frac{t^2 + r^2}{2}\{\ln[A_\beta(t^2 + r^2)] - 1\} - a_\beta \frac{t^2}{2}[\ln(A_\beta t^2) - 1] \quad (5)$$

where:

$$\begin{cases} a_\beta = \frac{2\pi}{\lambda_0} \dfrac{1/\sqrt{\delta R^2 + s_1^2} - 1/\sqrt{R^2 + s_2^2}}{\ln\left(\dfrac{R^2 + t^2}{\delta R^2 t^2}\right)} \\ A_\beta = \dfrac{1}{\delta R^2 + t^2}\exp\left[-\dfrac{\sqrt{R^2 + s_2^2}}{\sqrt{R^2 + s_2^2} - \sqrt{\delta R^2 + s_1^2}}\ln\left(\dfrac{R^2 + t^2}{\delta R^2 + t^2}\right)\right]. \end{cases} \quad (6)$$

and $$\phi_{P\gamma}(\rho) = -a_\gamma \frac{t^2 + r^2}{2}\{\ln[A_\gamma(t^2 + r^2)] - 1\} + a_\gamma \frac{t^2}{2}[\ln(A_\gamma t^2) - 1] \quad (7)$$

where:

$$\begin{cases} a_\gamma = \frac{2\pi}{\lambda_0} \dfrac{1/\sqrt{R^2 + s_1^2} - 1/\sqrt{\delta R^2 + s_2^2}}{\ln\left(\dfrac{R^2 + t^2}{\delta R^2 t^2}\right)} \\ A_\gamma = \dfrac{1}{\delta R^2 + t^2}\exp\left[\dfrac{\sqrt{R^2 + s_1^2}}{\sqrt{\delta R^2 + s_2^2} - \sqrt{R^2 + s_1^2}}\ln\left(\dfrac{R^2 + t^2}{\delta R^2 + t^2}\right)\right]. \end{cases} \quad (8)$$

From a power series expansion of Equations (5) or (7), it can be appreciated for purposes of the invention that spherical aberration is the dominant feature of the purposeful blur that is being introduced. This will be made more evident within a description of some specific embodiments.

For completing a design based on Equations (4)-(8), the desired range for the depth of field $s_1$, $s_2$ can be selected along with representative values for t, R, $\delta R$, $s_0$, and $\lambda_0$. Thereafter, the variables $a_\beta$, $A\beta$, and $\phi_{P\beta}$ (or $a_\gamma$, $A_\gamma$, and $\phi_{P\gamma}$) can be computed. From these, Equation (4) can be used to compute the aberration term W.

The logarithmic asphere described above is an example of a multifocal lens that can be constructed in accordance with the invention. From a more general point of view, a multifocal lens useful for extended depth-of-field imaging can be composed of any standard imaging arrangement that is designed to incorporate a predetermined amount of spherical aberration, including third-order spherical aberration as well as higher-order spherical aberrations. For example, such standard imaging and projection arrangements such as Petzval lenses, Cooke lenses, and double Gauss lenses can be used for these purposes.

For describing a multifocal lens in terms of a range of aberrations, it is useful to expand the aberration function $\phi_P$ in a series in terms of (r/R). For example, if the design parameters: $s_0 = 1500$ mm, $s_1 = 1400$ mm, $s_2 = 1615$ mm, $t = 62.5$ mm, R=8 mm, $\lambda_0$=0.5 μm, and δR=0, from Equations (4), (5), and (6) are used, a power series expansion of the phase delays of a β-type logarithmic asphere or a logarithmic phase plate is found as follows.

TABLE I

|  | $(r/R)^2$ | $(r/R)^4$ | $(r/R)^6$ | $(r/R)^8$ | $(r/R)^{10}$ |
|---|---|---|---|---|---|
| β lens system | 6721.22 | −45.63 | 0.32 | negligible | negligible |
| Ideal lens | 6702.07 | −26.35 | 0.21 | negligible | negligible |
| β phase plate | 19.15 | −19.28 | 0.11 | negligible | negligible |

In Table I, the first row of data is the whole phase delay function of the multifocal lens from Equation (1), i.e., $\phi_\beta(r)$= 6721.22$(r/R)^2$−45.63$(r/R)^4$+0.32$(r/R)^6$+ . . . . The second row of data is the radian phase delay function for an ideal lens arrangement, e.g., Petzval lens, Cooke lens, double Gauss lens, or Cassegrain system. The third row of data is the aberration terms of the phase delay function, which is the difference between the phase delays of the multifocal lens and an ideal lens. The dominant aberration term in the multifocal lens is the third-order spherical aberration (i.e., the fourth-order term of r/R). For diffraction-limited resolution, the largest allowable OPD is generally 0.25λ. To achieve a ten-fold increase in the depth of field, the spherical aberration is around 3 wavelengths (i.e., 19.28λ/2π=3λ), which is a little over ten times the allowable defocus for diffraction-limited imaging. Good performance of our multifocal lens includes spherical aberration in the amount of 1.8 to 6 wavelengths, while the amount of higher-order spherical aberration is largely insignificant. The multifocal lens designed this way will have an extended depth of field from 6 to 10 times that of a conventional ideal lens.

Another example of our multifocal lens has the same parameter values as above, but with δR/R=0.5 to illustrate the effectiveness of a central obscuration 26. The phase delay for the different terms is shown in the following Table II.

TABLE II

|  | $(r/R)^2$ | $(r/R)^4$ | $(r/R)^6$ | $(r/R)^8$ | $(r/R)^{10}$ |
|---|---|---|---|---|---|
| β lens system | 6734.06 | −52.11 | 0.36 | negligible | negligible |
| Ideal lens | 6702.07 | −26.35 | 0.21 | negligible | negligible |
| β phase plate | 32.99 | −25.76 | 0.15 | negligible | negligible |

Although the third-order spherical aberration $(r/R)^4$ looks larger than without central obscuration, the effective third-order aberration, i.e., the phase delay difference contributed from spherical aberration between the edge of the lens and the edge of the central obscured block is: 25.76−{25.76×(δR/R)$^2$}=19.32 radians. Thus, the effective third-order aberration amounts are similar for both the full aperture multifocal lens described by Table I and the centrally obscured multifocal lens described by Table II. Accordingly, the good performance centrally obscured multifocal lens has an effective third-order aberration that is still within a range from 1.8 to 6 wavelengths.

From the above description, it is apparent that the multifocal lens having an effective third-order spherical aberration in the range of 1.8 to 6 wavelengths can increase the depth of field six to ten times over that of a conventional lens. This conclusion pertains to any reasonable amount of central obscuration and also is independent of the wavelength of illumination, focal length and best focus object distance.

The second-order term, i.e. $(r/R)^2$ of the series expansion is not relevant to the increase of depth of field, but has the function of changing the position of center of the focus range. For the second-order term, we generally pick a value in a way that the aberration W at the inner edge of aperture 28 and the aberration W at the outer edge of central obscuration 26 have similar values to facilitate the phase plate or lens fabrication. In the case that no central obscuration is used, i.e., δR=0, a coefficient of the second-order term is selected so that the aberration W at the edge of aperture 28 is zero.

There are different ways that these controlled aberrations can be incorporated into the well-known imaging lens arrangements, e.g., Petzval lens or Cooke lens. For an existing lens arrangement, a simple way is to fabricate the aberration part of the multifocal lens as the phase plate 24, which can be attached to the aperture 28 of the lens arrangement. This method is most effective if the aperture 28 of the lens arrangement is outside the last lens element at the image plane (II) side.

Another method of multifocal lens realization is to incorporate the aberration into the lens design of the logarithmic asphere 34. By modifying a surface parameter of the logarithmic asphere 34, the overall phase delay function can still include the ideal lens part and the aberration part. This method has the advantage that no actual lens element is needed; e.g., the flip-over of the well-known lens arrangement introduces large amount of spherical aberration, which could be used as the starting design point. Two important features of this embodiment are that it contains good angular resolution as well as good color correction. The desired amount of spherical aberration can also be distributed among multiple lens elements of the design to provide more design flexibility.

A substantially distance-invariant impulse response is important to the recovery of images having extended depths of focus. A predetermined amount of spherical aberration can be used to produce a more distance-invariant impulse response for effective performance both with and without central obscuration. In the lens with δR=0.5, an optimum amount of spherical aberration has been found to be about 3 waves. However, fairly good image recovery is obtained for a spherical aberration in the range from 1.8 to 6 waves. FIGS. 3A to 3F show the effective range for a distance-invariant impulse response. Of note are: 1) the width of center peak; 2) the similarity of side lobes; and 3) the energy leaked to side lobes. FIGS. 4A to 4F show the corresponding impulse responses for a lens with δR=0.

The above discussions apply also to the case of the γ-type logarithmic asphere. For the γ-type logarithmic asphere, the coefficients of the power series for W change signs but are otherwise similar, which is shown below by way of example.

For the γ-type logarithmic asphere, the same design parameters can be used including: $s_0$=1500 mm, $s_1$=1400 mm, $s_2$=1615 mm, t=62.5 mm, R=8 mm, $\lambda_0$=0.5 μm, and δR=0. From Equations (4), (7), and (8), a power series expansion of the phase delays of a γ-type logarithmic asphere or a logarithmic phase plate is found as shown in Table III.

TABLE III

|  | $(r/R)^2$ | $(r/R)^4$ | $(r/R)^6$ | $(r/R)^8$ | $(r/R)^{10}$ |
|---|---|---|---|---|---|
| γ lens system | 6682.92 | −7.05 | 0.10 | negligible | negligible |
| Ideal lens | 6702.07 | −26.35 | 0.21 | negligible | negligible |

TABLE III-continued

|  | $(r/R)^2$ | $(r/R)^4$ | $(r/R)^6$ | $(r/R)^8$ | $(r/R)^{10}$ |
|---|---|---|---|---|---|
| γ phase plate | −19.15 | 19.30 | −0.31 | negligible | negligible |

As another example of the multifocal lens, Table IV is based on the same parameter values as above, but with δR/R=0.5 to illustrate the effectiveness of a central obscuration 26. This result can be compared to that in Table II.

TABLE IV

|  | $(r/R)^2$ | $(r/R)^4$ | $(r/R)^6$ | $(r/R)^8$ | $(r/R)^{10}$ |
|---|---|---|---|---|---|
| γ lens system | 6670.05 | −.56 | 0.07 | negligible | negligible |
| Ideal lens | 6702.07 | −26.35 | 0.21 | negligible | negligible |
| γ phase plate | −32.02 | 25.79 | −0.14 | negligible | negligible |

A difference between the β-type and γ-type phase plates is the sign change for the second and fourth-order terms. The fourth-order term, which corresponds to third-order spherical aberration, is positive for the γ-type lens and negative for the β-type lens. However, the absolute values of the corresponding third-order spherical aberration terms are similar for the same design range.

To demonstrate the performance of the γ-type lens, FIGS. 5A-5F depict the point spread functions for different amounts of third-order spherical aberration in units of OPD in combination with a central obscuration of δR/R=0.5. FIGS. 6A-6F depict the point-spread functions for different amounts of third-order spherical aberration in units of OPD with no central obscuration. It is apparent that the width of the point spread function changes from small to large when the object is farther away, which contrasts with the results of the β-type lens. From the FIGS. 5 and 6, it is apparent that the effective spherical aberration is still in the range of between 1.8 and 6 wavelengths, although the range is positive for the γ-type lens and negative for the β-type lens. As a further comparison between lens types, it is apparent that the β-type provides a better long distance performance, while the γ-type is favored when the close-in distances are more critical.

Based on the similarity of the impulse responses over the range of object distances, e.g., $s_1$ to $s_2$, digital processing of the intermediate image 30 can be used to sharpen the images of object points throughout the depth of field. One method of image recovery involves using an inverse filter, such as the Weiner-Helstrom inverse filter. Alternatively, a maximum entropy algorithm can be programmed into the digital processing subsystem. This approach for image recovery according to an embodiment of the invention is set forth below.

For the known, measured, noisy image d, point spread function h, and standard deviation $\sigma_{i,j}$ of noise θ in i,j$^{th}$ pixel of d, and unknown object f, one can write the following relation:

$$d = h**f+\theta \quad (9)$$

in which the double asterisk () is a spatial convolution. For an estimate of the object f, we start with an assumed object $f^{(0)}$ and iterate according to FIG. 7**. The maximum entropy criterion is to find an estimate of object f which will maximize S under the constraint of $C=C_{aim}$, where:

$$C = \sum_{i,j} \frac{1}{\sigma_{i,j}^2}(d - h**f)_{i,j}^2 \quad (10)$$

$$S = -\sum_{i,j} f_{i,j}\left(\ln\frac{f_{i,j}}{\langle f \rangle} - 1\right) \quad (11)$$

and $C_{aim}$ is the total number of pixels in the image and <f> is the average of image.

Figure 7:
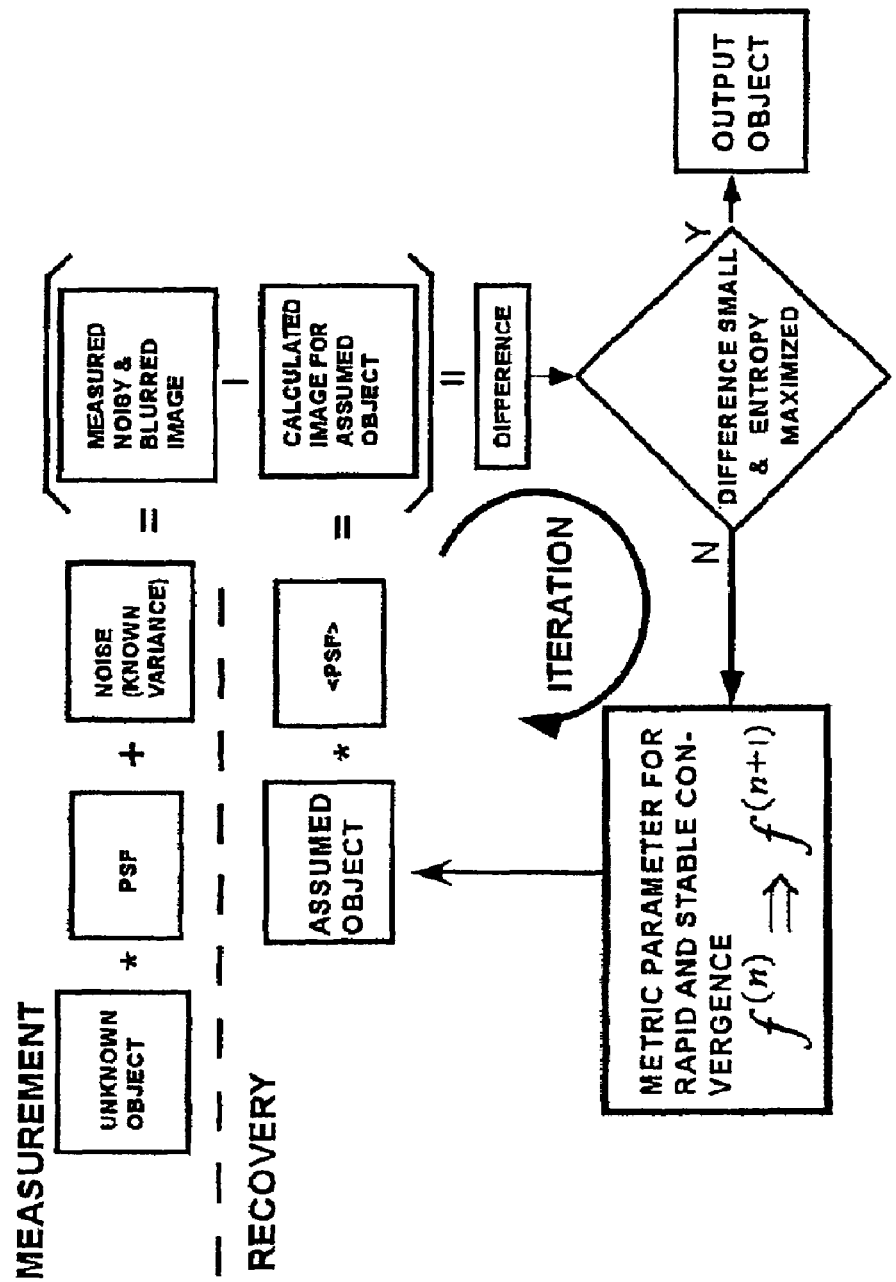
FIG. 7 is a top-level flow chart for nonlinear digital processing using a maximum entropy algorithm according to an embodiment of the invention.

The maximum entropy algorithm is an iterative approach to determining an estimate of object 20. A diagram of the algorithm is shown in FIG. 7, where an unknown object is convolved with the actual point spread function of the lens. Then, noise is added in the process of imaging. Starting with the initial estimate of the object, an image of this object is calculated by convolving with the single point spread function. Then, a difference between the measured blurred image and the calculated blurred image is calculated. If the difference is larger statistically than the noise in the experiment or the criterion of entropy maximization is not reached, the new estimation of the object is generated until both noise constraint and entropy maximization criterion are met, i.e., Equations (10) and (11) are satisfied.

The single point spread function used in the convolution can be calculated as an average of the point spread functions observed for the different focal depths. However, individual focal distances can be weighted differently to adjust the single point spread function for favoring certain object distances over others for compensating for other effects. The single point spread function could also be varied experimentally to achieve desired results for particular applications or scenes.

For each iteration, the new estimation of object is calculated from the earlier estimation by adding three (or four) direction-images with appropriate coefficients. i.e., $$\overrightarrow{f^{(n+1)}} = \overrightarrow{f^{(n)}} + \delta f = \overrightarrow{f^{(n)}} + \sum_i x_i \vec{e}_i \quad (12)$$

where $f^{(n+1)}$ is the $(n+1)^{th}$ estimation of object, $f^{(n)}$ is the earlier $n^{th}$ estimation, and $e_i$ is the $i^{th}$ direction-image.

Thus, two key steps of the algorithm are:
i) What direction-images $e_i$ should be used.
ii) How to calculate the corresponding coefficients $x_i$ of the direction images.

A new metric parameter γ is introduced as a first step to determining the direction-images $e_i$. The parameter γ adjusts the pixel values of direction-images derived from a steep ascent method. The parameter γ ranges from 0 to 1, although γ>1 is still possible. When this parameter is larger, more emphasis is given to the larger pixel values in the image, and also there exists more deviation of the direction images $e_i$ from direction images derived steepest ascent method.

Figure 8:
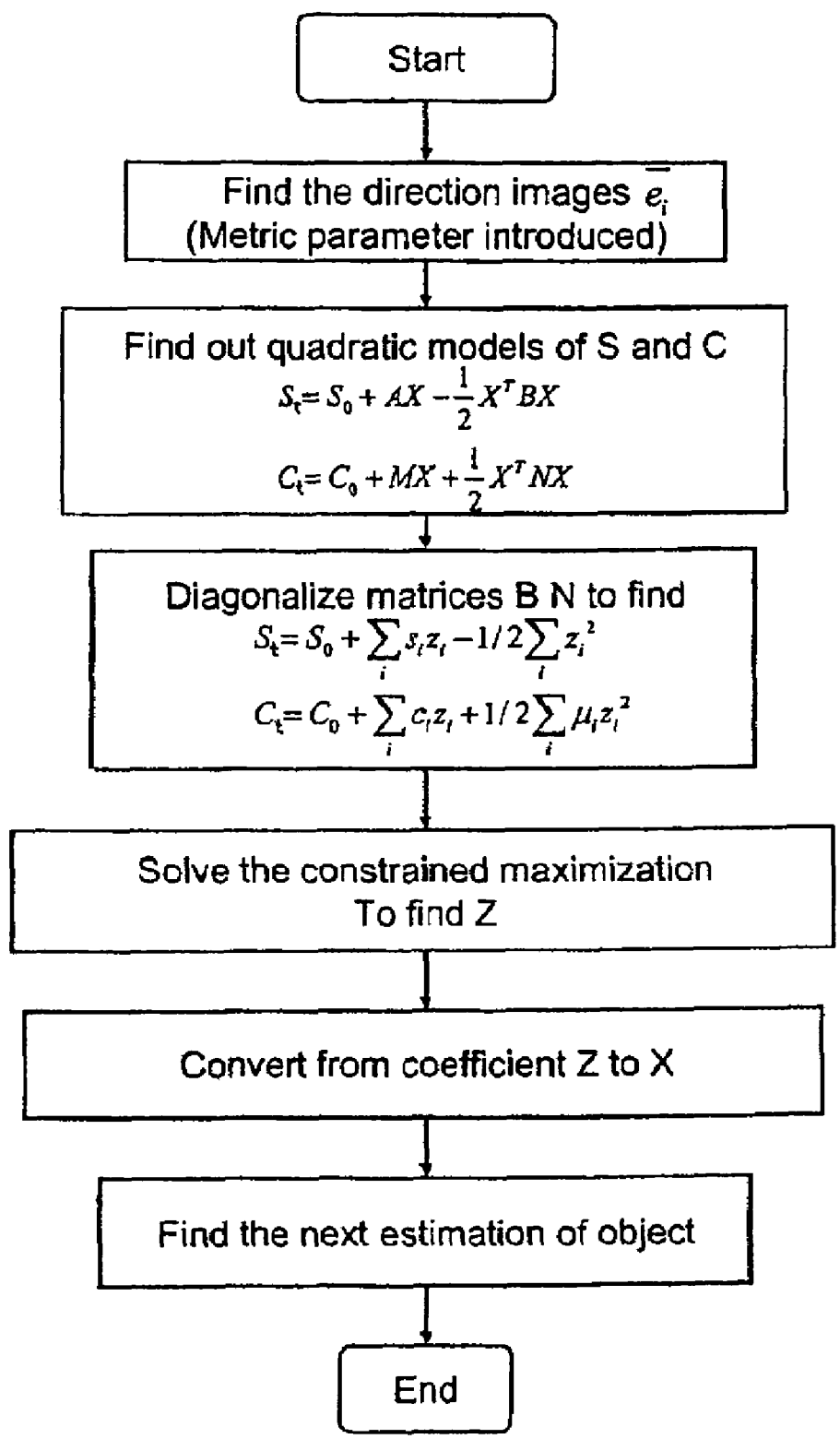
FIG. 8 is a flow chart showing steps within the maximum entropy algorithm for determining successive estimations of the object imaged by the multifocal imaging system.

In the second step, Taylor expansions of S and C relative to variables δf are calculated up to second order terms. Hence, the quadratic approximation models $S_t$ and $C_t$ are established. The quadratic models greatly facilitate the constrained maximization process because these quadratic equations are much easier to solve than the original nonlinear equations in Equations (10) and (11). The diagram of how to find the next estimation of the object is shown in FIG. 8.

Figure 9:
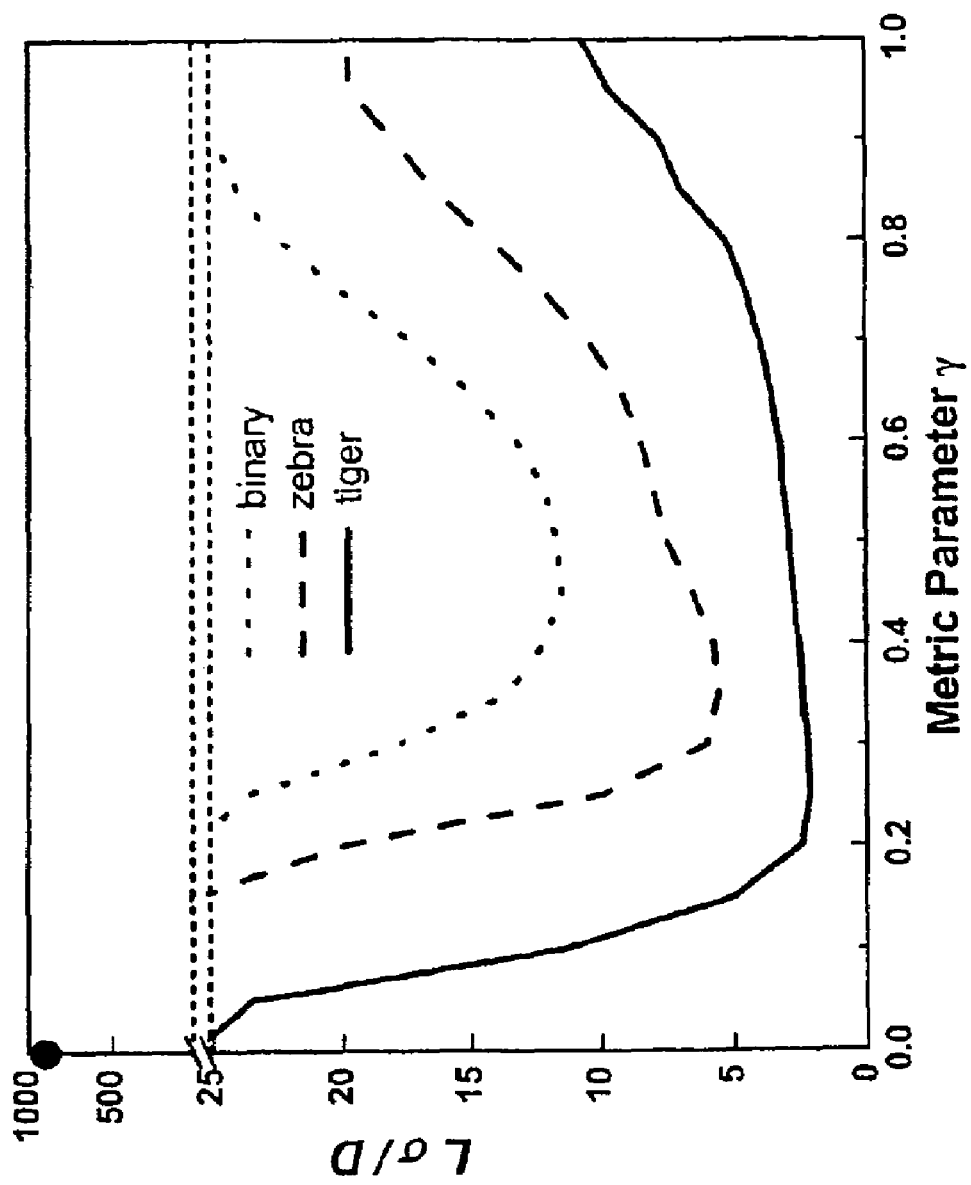
FIG. 9 is a graph plotting curves that show a convergence advantage associated with an optimization of a metric parameter in the maximum entropy algorithm according to an exemplary aspect of the invention.

In order to study the optimum value of metric parameter γ, an extended study has been made of the effect of varying the parameter γ. Three different pictures of varying histograms are used including: binary scene, zebra, and tiger. Each of these pictures has 256×256 pixels with the maximum pixel value scaled to 255. Each picture is blurred using 15 normalized impulse responses with the maximum blur consisting of a 5×5 matrix with 15 non-zero values and 10 zeros in the outer regions. Gaussian noise is added with a standard deviation σ ranging from 0.2 to 1.8 in 9 steps. The metric parameter γ is given 21 values ranging from 0.0 to 1.0. Hence, in these computer simulations there are about 8,000 cases. It is convenient to use an effectiveness parameter for the number of iterations, which is defined by Lσ/D, where L is the number of loops for the maximum entropy calculation to converge, σ is the noise standard deviation, and D is the number of non-zero pixel in the blurring function. In FIG. 9, we show a plot of Lσ/D vs. γ, where γ is the metric convergence parameter. The starting images in the algorithm are uniformly gray pictures with pixel values equal to the mean of the blurred images. The rationale for using the parameter, Lσ/D, is explained as follows.

For the computer simulation, the number of loops L for the maximum entropy recovery is linearly proportional to the area of the point spread function, D, or qualitatively proportional to the severity of the blur. The loop number is also approximately inversely proportional to the standard deviation of the noise, σ.

For a wide variety of pictorial content, it is apparent from FIG. 9 that the choice γ=0.4 provides a much faster convergence than γ=1. For the method of steepest ascent, γ=0, the algorithm does converge but it takes 173 times as many loops for a fixed σ/D as compared to the γ=0.4 case (for the zebra). Another feature not immediately apparent from the curves is that when the metric γ is equal to or close to 1, there is a chance that the algorithm can fail due to stagnation. By the experiment, the recommended value of the metric parameter is from 0.2 to 0.6 and more preferably from 0.3 to 0.5. In summary, it is clear that the use of the metric parameter γ guarantees the convergence and makes the algorithm converge much faster for a wide range of scenes. Stagnation is not observed with 0.3<γ<0.5. This new type of nonlinear digital processing is referred to as a metric parameter-maximum entropy (MPME) algorithm.

A more rigorous mathematical description of the metric parameter-maximum entropy algorithm follows within which control over the metric parameter γ enables the algorithm converge much faster for a wide range of scenes.

Two operators used in this section are defined in the following for convenience:

(i) If f is a vector f={$f_i$}, then $f^\gamma$ is a vector with its components defined as:

$(f^\gamma)_i \Box \{f_i^\gamma\}$ (ii) If f and g are vectors of the same dimension, f={$f_i$} and g={$g_i$}, then f.×g is a vector with its components defined as:

$(f.\times g)_i \Box \{f_i g_i\}$

To find the solution of {$f_k$} according to the Lagrange multiplier method, a new function is defined as:

$$Q = S - \lambda C \tag{13}$$

where is λ is a Lagrange multiplier constant. Now the problem becomes to maximize Q under the constraint $C = C_{aim}$. Since Q is a function of n variables, where n is the number of pixels in the image, which is usually very large, an iterative numerical method can be used to find the solution. In each iteration, the standard way is first to determine the search directions in which the solution is estimated to lie and then to find the step length along these directions.

The choice of directional images is important in determining the convergence and speed of the algorithm. In the steepest ascent method, the search direction for maximizing Q is ∇Q. But in order to adjust the weight of different pixel values $f_i$, the direction can be modified to be:

$$e_A = f^\gamma . \times \nabla Q \tag{14}$$

In the above equation, the new metric parameter γ improves the speed and reliability of the metric parameter-maximum entropy algorithm. For image deblurring in photography, the larger pixel values will have larger weight, so γ>0 is chosen to let the algorithm approach the desired larger pixel value faster. Generally, γ is chosen from 0 to 1. When γ=0, $e_A$ becomes the search direction for the steepest ascent method. When γ=1, $e_A$ becomes the search direction used by Burch et al. in a paper entitled "*Image restoration by a powerful maximum entropy method*," Comput. Visions Graph. Image Process. 23, 113-128 (1983), which is hereby incorporated by reference. Neither the steepest ascent method nor the method of Burch et al. incorporate the metric parameter γ, which provides a new mathematical construction that can be manipulated to increase the speed of convergence and avoid stagnation.

At the maximum point Q, we have:

$$\nabla Q = 0 \tag{15}$$

This implies ∇Q·∇Q needs to be minimized, too. Accordingly, the next search direction should be ½ ∇(∇Q·∇Q), or ∇∇Q·∇Q. Here ∇∇Q is the dyadic gradient whose component is defined as follows:

$$(\nabla \nabla Q)_{ij} = \frac{\partial^2}{\partial f_i \partial f_j} Q$$

Again, in order to emphasize the bigger pixel values, the direction is modified to be:

$$e_B = f^\gamma . \times [\nabla \nabla Q \cdot (f^\gamma . \times \nabla Q)] \tag{16}$$

Substitution of Equation (13) into Equations (14) and (16) yields the following:

$$\begin{cases} e_A = f^{\cdot\gamma} . \times \nabla S - \lambda f^{\cdot\gamma} . \times \nabla C \\ e_B = \lambda^2 f^{\cdot\gamma} . \times [\nabla \nabla C \cdot (f^{\cdot\gamma} . \times \nabla C)] - \\ \quad \lambda f^{\cdot\gamma} . \times [\nabla \nabla C \cdot (f^{\cdot\gamma} . \times \nabla S)] + \\ \quad f^{\cdot\gamma} . \times [\nabla \nabla S \cdot (f^{\cdot\gamma} . \times \nabla S)] - \\ \quad \lambda f^{\cdot\gamma} . \times [\nabla \nabla S \cdot (f^{\cdot\gamma} . \times \nabla C)]. \end{cases} \tag{17}$$

Observing the above expression, we know that the two directions actually are linear combinations of many directions, which can be treated as separate search directions, viz., $$\begin{cases} e_1 = f^{\cdot\gamma} . \times \nabla S \\ e_2 = f^{\cdot\gamma} . \times \nabla C \\ e_3 = f^{\cdot\gamma} . \times [\nabla \nabla C \cdot (f^{\cdot\gamma} . \times \nabla C)] \\ e_4 = f^{\cdot\gamma} . \times [\nabla \nabla C \cdot (f^{\cdot\gamma} . \times \nabla S)] \\ e_5 = f^{\cdot\gamma} . \times [\nabla \nabla S \cdot (f^{\cdot\gamma} . \times \nabla S)] \\ e_6 = f^{\cdot\gamma} . \times [\nabla \nabla S \cdot (f^{\cdot\gamma} . \times \nabla C)]. \end{cases} \tag{18}$$

From Equations (10) and (11), we have:

$$\begin{cases} (\nabla S)_i = -\ln\dfrac{f_i}{\langle f \rangle} \\ (\nabla\nabla S)_{ij} = -\dfrac{1}{f_i}\delta_{ij}, \end{cases} \quad (19)$$

and $$\begin{cases} (\nabla C)_i = \displaystyle\sum_{k=1}^{n}\sum_{j=1}^{n}\dfrac{2}{\sigma_k^2}(H_{kj}f_j - d_k)H_{ki} \\ (\nabla\nabla C)_{ij} = \displaystyle\sum_{k=1}^{n}\dfrac{2}{\sigma_k^2}H_{kj}H_{ki}. \end{cases} \quad (20)$$

Substitution of Equations (19) and (20) into (18) yields the components of each search direction as follows:

$$\begin{cases} (e_1)_i = -f_i^{\gamma}\ln\dfrac{f_i}{\langle f \rangle} \\ (e_2)_i = f_i^{\gamma}\displaystyle\sum_{k=1}^{n}\sum_{j=1}^{n}\dfrac{2}{\sigma_k^2}(H_{kj}f_j - d_k)H_{ki} \\ (e_3)_i = f_i^{\gamma}\displaystyle\sum_{j=1}^{n}\sum_{k=1}^{n}\sum_{l=1}^{n}\sum_{m=1}^{n} f_m^{\gamma}\dfrac{4}{\sigma_k^2\sigma_l^2}(H_{kj}f_j - d_k)H_{km}H_{li}H_{lm} \\ (e_4)_i = -f_i^{\gamma}\displaystyle\sum_{j=1}^{n}\sum_{k=1}^{n} f_j^{\gamma}\dfrac{2}{\sigma_k^2}H_{ki}H_{kj}\ln\dfrac{f_j}{\langle f \rangle} \\ (e_5)_i = f_i^{2\gamma-1}\ln\dfrac{f_i}{\langle f \rangle} \\ (e_6)_i = -f_i^{2\gamma-1}\displaystyle\sum_{k=1}^{n}\sum_{j=1}^{n}\dfrac{2}{\sigma_k^2}(H_{kj}f_j - d_k)H_{ki}. \end{cases} \quad (21)$$

In the algorithm, $e_5$ and $e_6$ can be disregarded as search directions because when $\gamma=0.5$ they decompose to $e_1$ and $e_2$, respectively; and also when $\gamma<0.5$, for small pixel values, they both involve dividing by small numbers, which can cause numerical accuracy problems. Accordingly, $e_1$, $e_2$, $e_3$, and $e_4$ are chosen as four search directions.

To simplify the algorithm, three search directions are enough for this problem, we can pick $e_1$, $e_2$, and $e_3$ or we can pick $e_1$, $e_2$, and $e_4$, $-e_3$, as another choice. The algorithm converges at about the same speed, although the latter choice is a little better. Here, $\lambda$ is a constant chosen by Equations (13) and (15), i.e., $\lambda$ is given by:

$$\lambda = \left[\dfrac{\displaystyle\sum_{i=1}^{n} f_i^{\gamma}\left(\dfrac{\partial S}{\partial f_i}\right)^2}{\displaystyle\sum_{i=1}^{n} f_i^{\gamma}\left(\dfrac{\partial C}{\partial f_i}\right)^2}\right]^{1/2} \quad (22)$$

In either case, three directions can be written as $e_1$, $e_2$, and $e_3$ for simplicity. In the calculation of search directions, it is apparent that that the directions $e_2$ and $e_3$ are basically the convolutions related to the real point spread function, h, and object, f, before being shaped to one dimension. Care needs to be taken to make certain that there is not pixel shift or image position shift after the convolution operation.

After three search directions are calculated for the current iteration (n), the next task is to find an estimation of the object for the next iteration $f^{(n+1)}$, which is defined as:

$$f^{(n+1)} = f^{(n)} + \delta f \quad (23)$$

where $\delta f$ is the change of image for the current iteration. It is defined as linear combinations of search directions, with their coefficients to be determined, i.e., $$\delta f = x_1 e_1 + x_2 e_2 + x_3 e_3 \quad (24)$$

Since S and C are functions of f that vary in a complicated way, a Taylor expansion can be used to calculate their values as a function of the search directions. Retaining up to the quadratic terms, $S_t$ and $C_t$ can be written as follows:

$$S_t = S(f^{(n)}) + \nabla S \cdot \delta f + \dfrac{1}{2}\delta f \cdot \nabla\nabla S \cdot \delta f \quad (25)$$

$$C_t = C(f^{(n)}) + \nabla C \cdot \delta f + \dfrac{1}{2}\delta f \cdot \nabla\nabla C \cdot \delta f \quad (26)$$

Substitution of Equation (24) into Equations (25) and (26) yield the following expressions written in matrix form, $$S_t = S_0 + AX - \dfrac{1}{2}X^T B X \quad (27)$$

$$C_t = C_0 + MX + \dfrac{1}{2}X^T N X. \quad (28)$$

In Equations (27) and (28), the notation is defined as follows:

$$S_0 = S(f^{(n)}) \quad (29)$$

$$C_0 = C(f^{(n)})$$

$$X = [\,x_1 \; x_2 \; x_3\,]^T$$

$$A = [\nabla S \cdot e_1 \;\; \nabla S \cdot e_2 \;\; \nabla S \cdot e_3]$$

$$B = -\begin{bmatrix} e_1 \cdot \nabla\nabla S \cdot e_1 & e_1 \cdot \nabla\nabla S \cdot e_2 & e_1 \cdot \nabla\nabla S \cdot e_3 \\ e_2 \cdot \nabla\nabla S \cdot e_1 & e_2 \cdot \nabla\nabla S \cdot e_2 & e_2 \cdot \nabla\nabla S \cdot e_3 \\ e_3 \cdot \nabla\nabla S \cdot e_1 & e_3 \cdot \nabla\nabla S \cdot e_2 & e_3 \cdot \nabla\nabla S \cdot e_3 \end{bmatrix}$$

$$M = [\nabla C \cdot e_1 \;\; \nabla C \cdot e_2 \;\; \nabla C \cdot e_3]$$

$$N = \begin{bmatrix} e_1 \cdot \nabla\nabla C \cdot e_1 & e_1 \cdot \nabla\nabla C \cdot e_2 & e_1 \cdot \nabla\nabla C \cdot e_3 \\ e_2 \cdot \nabla\nabla C \cdot e_1 & e_2 \cdot \nabla\nabla C \cdot e_2 & e_2 \cdot \nabla\nabla C \cdot e_3 \\ e_3 \cdot \nabla\nabla C \cdot e_1 & e_3 \cdot \nabla\nabla C \cdot e_2 & e_3 \cdot \nabla\nabla C \cdot e_3 \end{bmatrix}$$

where $[\cdots]^T$ denotes the transpose of matrix. Matrices A, B, M, and N can be calculated from Equations (20) and (21).

Equations (27) and (28) can be simplified by introducing new variables to diagonalize B and N. First, the rotation matrix R is found to diagonalize the matrix B, i.e., $$RBR^T = \mathrm{diag}(\lambda_1, \lambda_2, \lambda_3) \quad (30)$$

where diag( . . . ) denotes the diagonal matrix.

A new variable Y is defined as follows $$Y = RX \quad (31)$$

Substitution of Equations (31) and (30) into Equations (27) and (28) yield the following expressions:

$$S_t = S_0 + AR^T Y - \frac{1}{2} Y^T \text{diag}(\lambda_1, \lambda_2, \lambda_3) Y \qquad (32)$$

$$C_t = C_0 + MR^T Y + \frac{1}{2} Y^T R N R^T Y \qquad (33)$$

Some eigenvalues of B may be very small, and this is discussed in the following two cases.

Case i) Assume that none of $\lambda_1$, $\lambda_2$, and $\lambda_3$ is small.
We introduce Z, such that:

$$Z = \text{diag}(\sqrt{\lambda_1}, \sqrt{\lambda_2}, \sqrt{\lambda_3}) Y \qquad (34)$$

Substituting Equation (34) into equations (32) and (33), yields:

$$S_t = S_0 + AR^T \text{diag}\left(\frac{1}{\sqrt{\lambda_1}}, \frac{1}{\sqrt{\lambda_2}}, \frac{1}{\sqrt{\lambda_3}}\right) Z - \frac{1}{2} Z^T Z \qquad (35)$$

$$C_t = C_0 + MR^T \text{diag}\left(\frac{1}{\sqrt{\lambda_1}}, \frac{1}{\sqrt{\lambda_2}}, \frac{1}{\sqrt{\lambda_3}}\right) Z + \frac{1}{2} Z^T P Z, \qquad (36)$$

where:

$$P = \text{diag}\left(\frac{1}{\sqrt{\lambda_1}}, \frac{1}{\sqrt{\lambda_2}}, \frac{1}{\sqrt{\lambda_3}}\right) R N R^T \text{diag}\left(\frac{1}{\sqrt{\lambda_1}}, \frac{1}{\sqrt{\lambda_2}}, \frac{1}{\sqrt{\lambda_3}}\right)$$

A second rotational matrix V is introduced to diagonalize P, i.e., $$V P V^T = \text{diag}(\mu_1, \mu_2, \mu_3) \qquad (37)$$

and also define U as:

$$U = V Z \qquad (38)$$

Then, substitution of Equations (37) and (38) into Equations (35) and (36) yield the following expressions:

$$S_t = S_0 + AR^T \text{diag}\left(\frac{1}{\sqrt{\lambda_1}}, \frac{1}{\sqrt{\lambda_2}}, \frac{1}{\sqrt{\lambda_3}}\right) V^T U - \frac{1}{2} U^T U \qquad (39)$$

$$C_t = C_0 + MR^T \text{diag}\left(\frac{1}{\sqrt{\lambda_1}}, \frac{1}{\sqrt{\lambda_2}}, \frac{1}{\sqrt{\lambda_3}}\right) V^T U + \frac{1}{2} U^T \text{diag}(\mu_1, \mu_2, \mu_3) U. \qquad (40)$$

Combining Equations (31), (34), and (38), yields the identity:

$$X = R^T \text{diag}\left(\frac{1}{\sqrt{\lambda_1}}, \frac{1}{\sqrt{\lambda_2}}, \frac{1}{\sqrt{\lambda_3}}\right) V^T U \qquad (41)$$

Case ii) Assume $\lambda_3$ is small relative to $\lambda_1$ and $\lambda_2$.

In this case, $\lambda_3 \approx 0$, $y_3 = 0$ in Equation (31), and also:

$$\begin{bmatrix} z_1 \\ z_2 \\ z_3 = 0 \end{bmatrix} = \begin{bmatrix} \sqrt{\lambda_1} & 0 & 0 \\ 0 & \sqrt{\lambda_2} & 0 \\ 0 & 0 & 0 \end{bmatrix} \begin{bmatrix} y_1 \\ y_2 \\ y_3 = 0 \end{bmatrix} \qquad (42)$$

Then, Equations (32) and (33) become:

$$S_t = S_0 + AR^T \text{diag}\left(\frac{1}{\sqrt{\lambda_1}}, \frac{1}{\sqrt{\lambda_2}}, 0\right) Z - \frac{1}{2} Z^T Z \qquad (43)$$

$$C_t = C_0 + MR^T \text{diag}\left(\frac{1}{\sqrt{\lambda_1}}, \frac{1}{\sqrt{\lambda_2}}, 0\right) Z + \frac{1}{2} Z^T P Z, \qquad (44)$$

where:

$$P = \text{diag}\left(\frac{1}{\sqrt{\lambda_1}}, \frac{1}{\sqrt{\lambda_2}}, 0\right) R N R^T \text{diag}\left(\frac{1}{\sqrt{\lambda_1}}, \frac{1}{\sqrt{\lambda_2}}, 0\right)$$

A second rotation matrix V is introduced, such that $$V P V^T = \begin{bmatrix} \mu_1 & 0 & 0 \\ 0 & \mu_2 & 0 \\ 0 & 0 & \mu_3 = 0 \end{bmatrix} \qquad (45)$$

where $$V = \begin{bmatrix} v_{11} & v_{12} & 0 \\ v_{21} & v_{22} & 0 \\ 0 & 0 & 0 \end{bmatrix}$$

A new variable U is defined as:

$$U = V Z \qquad (46)$$

then $$S_t = S_0 + AR^T \text{diag}\left(\frac{1}{\sqrt{\lambda_1}}, \frac{1}{\sqrt{\lambda_2}}, 0\right) V^T U - \frac{1}{2} U^T U \qquad (47)$$

$$C_t = C_0 + MR^T \text{diag}\left(\frac{1}{\sqrt{\lambda_1}}, \frac{1}{\sqrt{\lambda_2}}, 0\right) V^T U + \frac{1}{2} U^T \text{diag}(\mu_1, \mu_2, 0) U \qquad (48)$$

Combining Equations (31), (42), and (46), yields the identity:

$$X = R^T \text{diag}\left(\frac{1}{\sqrt{\lambda_1}}, \frac{1}{\sqrt{\lambda_2}}, 0\right) V^T U \qquad (49)$$

The other case, when two values of $\lambda_1$, $\lambda_2$, and $\lambda_3$ are small, can be treated in a similar way. In general, the following expressions of $S_t$ and $C_t$ can be written for all cases with the quadratic matrices diagnolized as follows:

$$S_t = S_0 + \sum s_i u_i - \frac{1}{2} \sum u_i^2 \qquad (50)$$

$$C_t = C_0 + \sum c_i u_i + \frac{1}{2} \sum \mu_i u_i^2 \qquad (51)$$

The relation between $u_i$ and $x_i$ (i=1, 2, 3 or i=1, 2, or i=1) can be found in the identities Equations (41) or (49).

Now the maximum entropy problem becomes one to maximize $S_t$ in Equation (50) under the constraint of $C_t=C_{aim}$ in Equation (51). $C_t$ in Equation (51) has minimum value of:

$$C_{min} = C_0 - \frac{1}{2}\sum \frac{c_i^2}{\mu_i} \quad (52)$$

Clearly, $C_{min}$, could be larger than $C_{aim}$. If this happens, then the maximization of S under the constraint of $C_t=C_{aim}$ will not have any solution. Accordingly, a new constraint is defined that can always be reached as follows:

$$C_t = \check{e}_0 \square \max\left\{C_0 - \frac{1}{3}\sum \frac{c_i^2}{\mu_i}, C_{aim}\right\} \quad (53)$$

The Lagrange multiplier method can be used to solve the maximization in Equation (50) by introducing a new variable $Q_t$ as follows:

$$Q_t = \alpha S_t - C_t (\alpha > 0) \quad (54)$$

where $Q_t$ corresponds to the Q wave variable at the left side of Equation (54), ($\alpha$>0) guarantees that the solution found will maximize the entropy instead of minimizing it.

Substituting Equations (50) and (51) into (54), yields the values of $u_i$ that maximize $Q_t$ as follows:

$$u_i = \frac{\alpha s_i - c_i}{\mu_i + \alpha} \quad (55)$$

where $\alpha$ is determined by solving the following equation, which is derived by the substitution of Equation (55) into Equation (51) and by the use of the constraint in Equation (53):

$$C_0 + \sum c_i \frac{\alpha s_i - c_i}{\mu_i + \alpha} + \frac{1}{2}\sum \mu_i \left(\frac{\alpha s_i - c_i}{\mu_i + \alpha}\right)^2 = \check{e}_0 (\alpha > 0) \quad (56)$$

After $\alpha$ is known, coefficients of $x_1$, $x_2$, and $x_3$ are found by Equations (55) and (41) or (49), and the next assumed object for the next iteration can be calculated by Equations (23) and (24). At each iteration, the negative values in the assumed object are reset to zero.

At each iteration if the constraint of $C=C_{aim}$ is satisfied, whether the entropy is maximized is checked by determining if $\nabla Q$ is zero, or whether $\nabla S$ and $\nabla C$ are parallel by calculating the following value:

$$test = \frac{\nabla S \cdot \nabla C}{\sqrt{\nabla S \cdot \nabla S}\sqrt{\nabla C \cdot \nabla C}} \quad (57)$$

The algorithm stops if $|test|<0.1$.

There is a special case when coefficients of $x_1$, $x_2$, and $x_3$ are too large such that the expressions in Equations (25) and (26) are not accurate. The Burch et al. paper deals with this by introducing a distance penalty parameter. However, if the starting estimation of the object is a uniformly gray picture or the blurred picture, then this complexity can generally be avoided. Only when the starting image is random should the extra parameter be introduced in the algorithm but only through the first several loops. A further description of the metric parameter-maximum entropy algorithm is found in a paper authored by the co-inventors entitled "Computational imaging with the logarithmic asphere: theory" J. Opt. Soc. Am. A, Vol. 20, No. 12, December 2003, which is hereby incorporated by reference.

In addition to increasing the speed of convergence and avoiding stagnation improved deblurring and image recovery are possible. The metric parameter-maximum entropy algorithm or MPME algorithm improves image quality by increasing the contrast of the recovered image. Adjustments to the metric parameter .gamma., particularly to within the range of 0.2 to 0.6 result in a modulation transfer function having a more rectangular form, which preserves contrast of higher spatial frequency components. The effect of the metric parameter $\gamma$ is also evident on the point-spread function as a reduction in side lobe oscillations apparent in the intermediate image. The final point images are closer to true points with little or no ringing. Disappearance of the oscillating rings also increases contrast.

The MPME algorithm provides an iterative digital deconvolution method capable of starting with any image. An estimate of the next new image can contain a linear combination of directional images. The metric parameter $\gamma$ modifies the directional images from those provided by conventional maximum entropy algorithms, while reconciling the directional images of the conventional algorithms as integer instances of the metric parameter $\gamma$. Preferably, a quadratic Taylor expansion is used to calculate the values of the entropy S and the statistical noise constraint C as functions of the search directions. The modified statistical noise constraint assures an iterative solution of the new image estimate.

Figure 15:
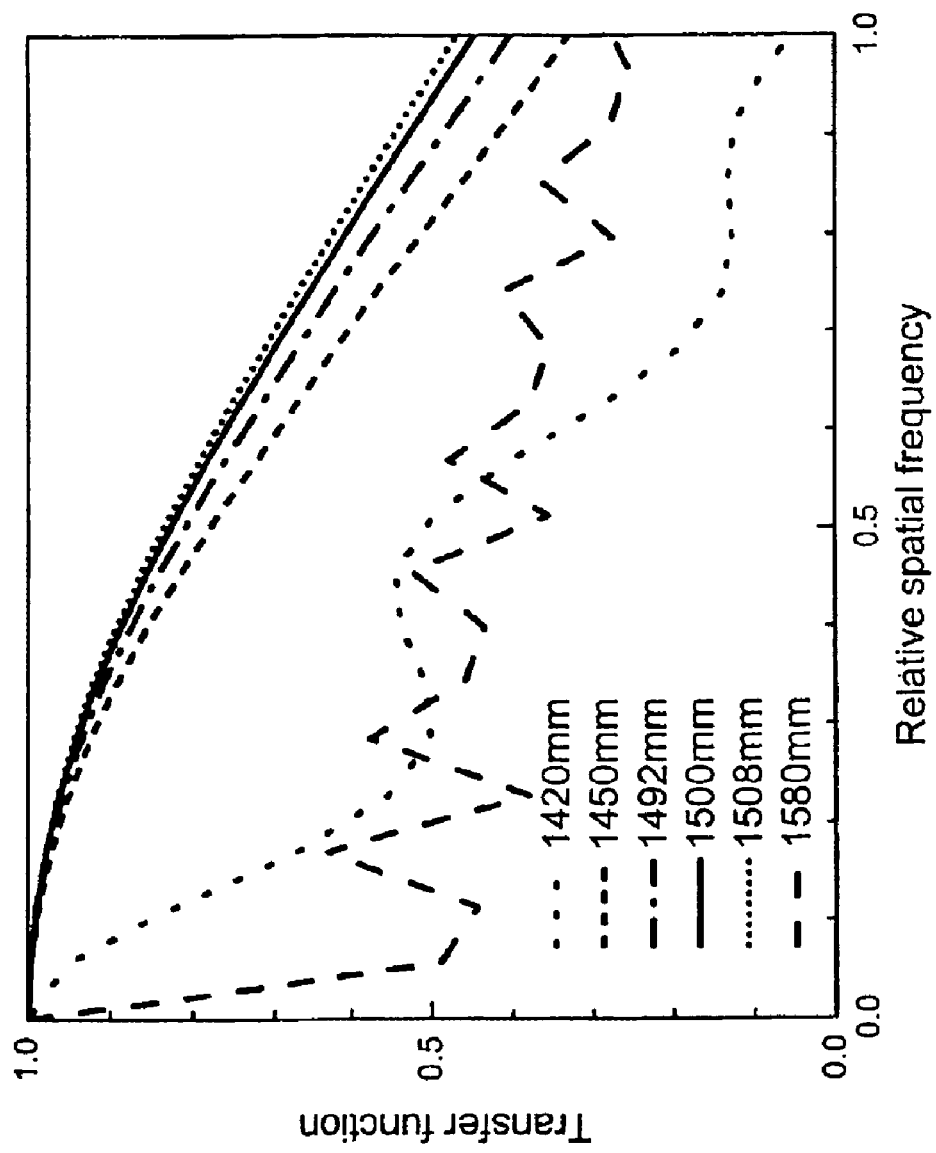
FIG. 15 is a graph plotting the overall transfer functions of the integrated imaging system with a centrally obscured aperture for six object distances, according to an illustrative aspect of the invention.

The metric parameter-maximum entropy algorithm (MPME) has an important range of applications due to the "box-like" form of the resulting overall modulation transfer function, as shown in FIG. 15. Hence, at high spatial frequencies the contrast of any digital image will be higher than is typical of the classical fall-off of photographic images. As is well known, the incoherent image optical transfer function falls off in a triangular-like manner as the spatial frequency ranges from zero to the Nyquist limit, also known as the cutoff frequency. The MPME algorithm provides sharper, crisper, high contrast output. While there are earlier algorithms that provide some form of high-frequency or edge sharpening, these earlier algorithms amplify the high-frequency noise as well. For example one such algorithm consists of a two-dimensional FFT, followed by high-frequency emphasis, followed by an inverse FFT. However, as is well known, these earlier methods of providing emphasis or higher contrast at the higher spatial frequencies amplify the noise in the image. From experiments using the MPME algorithm, as is apparent from a study of the operation as shown in FIGS. 7 and 8, the MPME algorithm does not have this drawback. The MPME algorithm provides sharper contrast at the higher spatial frequencies without undue amplification of the noise. Therefore, this contributes to its general applicability in digital image processing.

The optional central obscuration 26 of the aperture 28 as apparent in FIG. 2 has been introduced to improve the system performance. By incorporating the central obscuration 26 into the multifocal imaging system 12, the processed image can have higher resolution and higher contrast, especially for the close in object distance. The details of this comparison are described in the following paragraphs.

To illustrate the improved performance introduced by the centrally obscured logarithmic asphere, FIGS. 10 and 11 compare the images produced through a full aperture logarithmic asphere with the images produced through a centrally obscured logarithmic asphere. The imaging of a two-point object simulation is shown in FIG. 10, based on a full aperture β-design logarithmic asphere. The design parameters are: $s_1$=1400 mm close distance, $s_2$=1615 mm far distance, and $s_0$=1500 mm center distance with an f/# of the lens at 4. The diffraction-limited depth of field is ±8 mm. The two object points are separated by the diffraction limit distance, viz., 2.27 μm. The images of the object blurred by the logarithmic asphere are shown in FIGS. 10(*b*)-(*d*) for the object distances s=1450 mm, 1500 mm, and 1580 mm, respectively. FIGS. 10(*e*)-(*h*) show the maximum entropy recovery results for the images in FIGS. 10(*a*)-(*d*), respectively. For comparison, the performance of an idealized lens is shown in FIGS. 10(*a*) and 10(*e*). Immediately apparent is the excellent recovery due to the deconvolution inherent in the maximum entropy algorithm. A standard deviation of the noise used in these recoveries is σ=1.5. The point spread function used for FIG. 10(*b*)-(*d*) is the average point spread function of the logarithmic asphere over the design range, and the point spread function used for FIG. 10(*a*) is the actual diffraction blur of the ideal lens. In the maximum entropy recovery using any single member of the impulse responses will lead to near perfect recovery at that distance. However, for extended depth-of-field, it is more advantageous to use the averaged point spread function. Still, as seen in FIGS. 10(*b*)-(*d*), by the elimination of most of the oscillation rings and the narrowing of the blurs, nearly diffraction-limited resolution can be achieved over the entire range. Faint rings are apparent in the recoveries shown in FIGS. (g) and (h).

A similar simulation using the centrally obscured logarithmic asphere 26 is shown in FIGS. 11(*a*)-(*o*). The same close ($s_1$=1400 mm), far ($s_2$=1615 mm) and center ($s_0$=1500 mm) distances are used. The center obscuration δR=0.5. i.e., by area 25% of the aperture is not used. This obscuration causes an approximately 25% loss of light intensity, which needs to be considered in a final design trade-off. In FIG. 11, the rows are for object distances 1450 mm, 1492 mm, 1500 mm, 1508 mm, and 1580 mm, respectively, and the columns are for ideal images, intermediate (blurred) images, and recovered images, respectively. The conventional depth of field (for a full aperture f/4.0) ranges from 1492 mm to 1508 mm. A single average impulse response over the design range is used for all five recoveries. The similarity of blur for the logarithmic asphere is clearly seen from the center column of the intermediate (blurred) images, all have two bright peaks at the center accompanied by low intensity oscillating rings. The center bright peaks also have similar sizes. The oscillating rings do not pose a problem since excellent recoveries are achieved for all five images. The two-point recovery (right column) shows excellent diffraction-limited resolution from 1450 mm to 1580 mm. At s=1420 mm (not shown), the two points are still easily resolvable, but not as clearly as those in the figures.

The performance improvements, particularly for close-in distances (β-design), is believed due to both the narrower central peak of the average point spread function and the similar oscillating ring structure of the point spread function over the designed object range. These two factors lead to a point spread function that varies less with object distance s, so that the average point spread function used in the digital processing can provide a significantly improved output. Thus, in comparing FIGS. 10 and 11, a significantly improved result can be achieved by using the centrally obscured logarithmic asphere. The rings are more suppressed and the two points are more clearly resolvable over a range of object distances. In addition, the central obscuration can avoid conditions such as contrast inversion for larger amounts of defocus.

Figure 12:
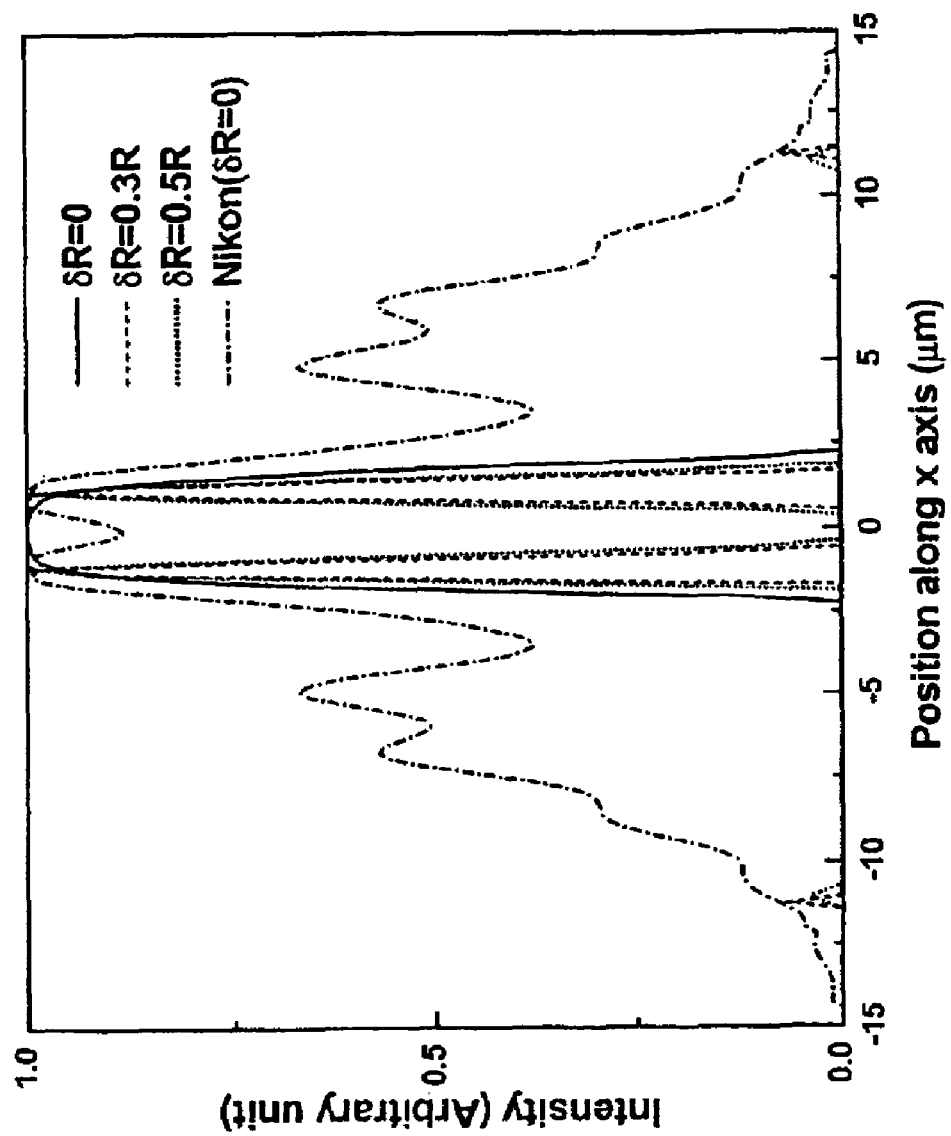
FIG. 12 is a graph plotting recovered data for a two point object at a defocused object distance comparing results from a spherically aberrated imaging subsystem with different central obscuration values and the blurred image data for a Nikon lens without a central obscuration, according to an illustrative aspect of the invention.
Figure 13:
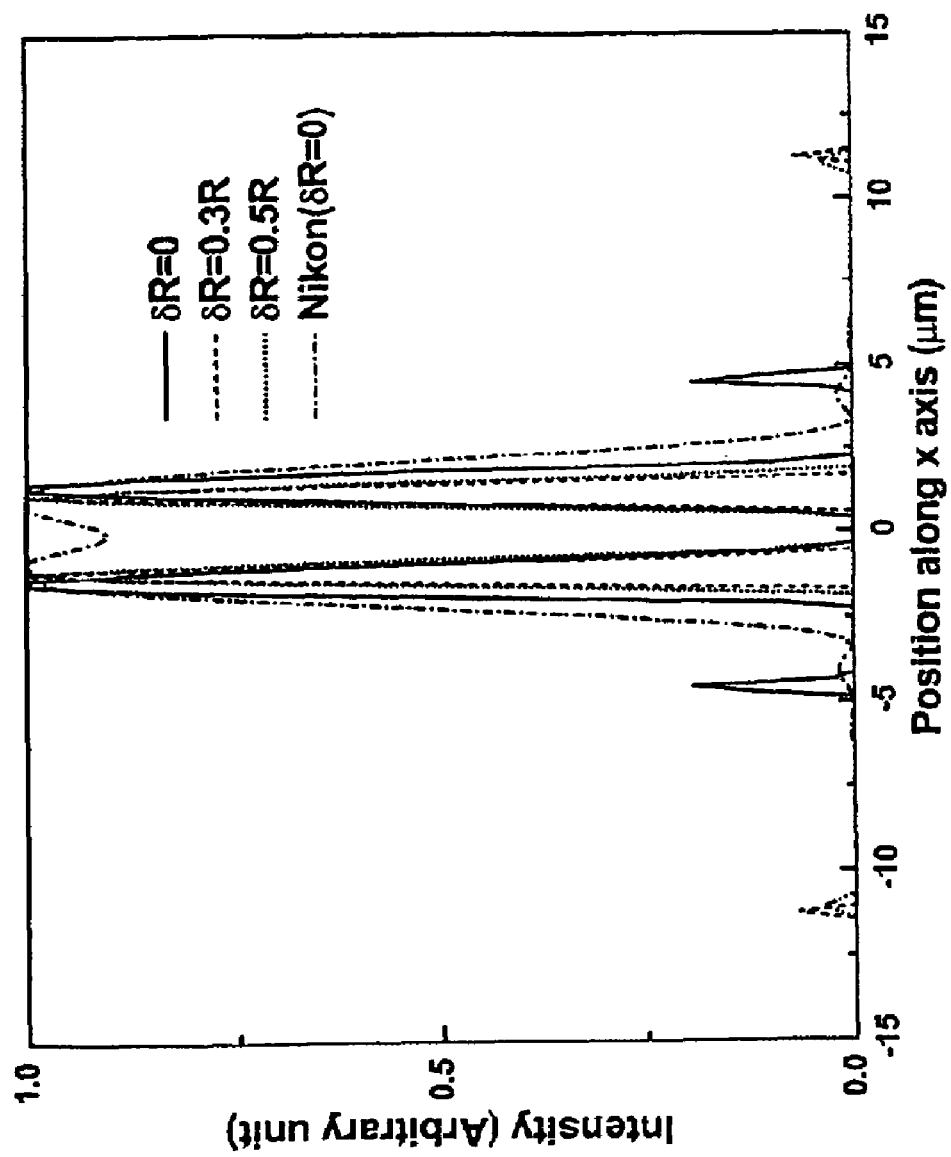
FIG. 13 is a graph plotting recovered data for a two point object at an optimum object distance comparing results from a spherically aberrated imaging subsystem with different central obscuration values and the blurred image data for the Nikon lens without central obscuration, according to an illustrative aspect of the invention.
Figure 14A:
FIG. 14 is a set of images illustrating the maximum entropy recovery of a defocused tiger image, including image (c) formed by an ideal lens without a central obscuration and recovered images (a), (b), and (d) from a logarithmic lens with central obscuration values of zero (i.e., no central obscuration), 0.3 R, and 0.5 R, respectively.
Figure 14C:
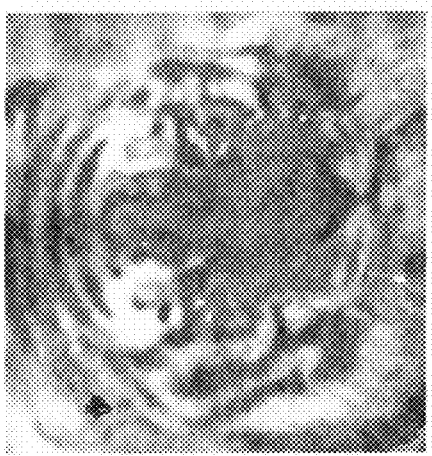
Figure 14B:
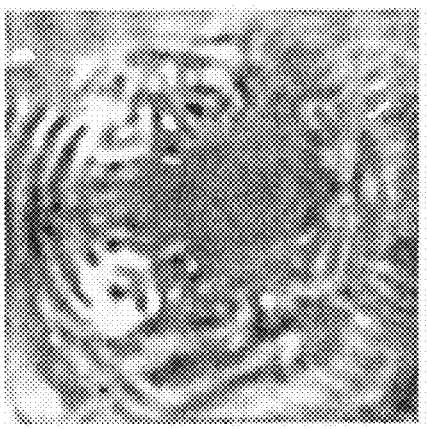
Figure 14D:
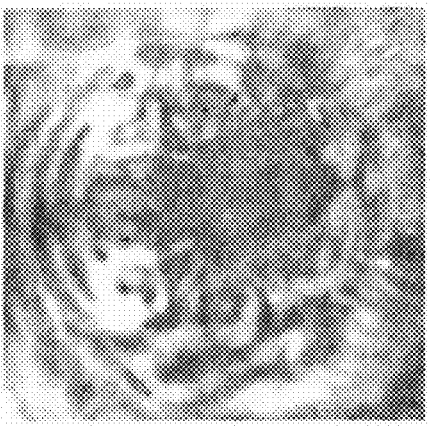

To further demonstrate the improved performance of centrally obscured logarithmic asphere, we show in FIGS. 12 and 13 intensity distributions associated with imaging the same two-point object using three logarithmic aspheres having different central obscuration values of δR=0, δR=0.3, and δR=0.5, respectively. When the object is at a distance of s=1450 mm, or 50 mm closer than the best focus plane, the recovered one dimensional pixel values in the two point direction are plotted in FIG. 12 along with the pixel values of the blurred image by an ideal lens. For producing the ideal lens curve, the full aperture of the lens is used, i.e., δR=0. A fully resolvable two point recovery is produced with center obscuration of δR=0.5. However, when the obscuration is reduced to δR=0.3, the recovery points are barely resolvable; and when there is no central obscuration, δR=0, the recovery points are unresolvable. These curves clearly show the performance improvement made by a correctly sized central obscuration. The increase in performance is believed mainly due to the similarities of the point spread functions over the design range of object distances instead of from the increase of the depth of field by central obscuration, since we have seen from the earlier section that the increase in depth of field by central obscuration of aperture is, by itself, much more limited. FIG. 13 illustrates a set of similar curves for an object is at a distance of s=1500 mm, the best focus position for the logarithmic aspheres and the ideal lens. Again, advantages of the logarithmic asphere with central obscuration for both the resolving power and contrast are apparent.

The improved performance made possible by the invention has particular benefits for photography, which can be observed by comparison from the pictures of FIGS. 14(*a*)-(*d*). In this simulation, the tiger picture is at a distance of 1580 mm (i.e., 80 mm beyond the best focus position). FIG. 14(*a*) is the recovered image for the logarithmic asphere without center obscuration. FIGS. 14(*b*) and 14(*d*) are the recovered images for the logarithmic asphere with central obscuration of δR=0.3 and δR=0.5, respectively. FIG. 14(*c*) shows the tiger image reproduced by an ideal lens with full aperture for comparison purposes. The logarithmic aspheres both with and without obscuration are capable of extending the depth of field. However, the recovered images for logarithmic aspheres with obscuration are better because there are fewer artifacts. The artifacts of the recovery are believed to appear because of differences between the point spread functions through the range of object distances, while the average point spread function over the design range is used for all the recoveries. In inspecting these pictures, it is of note that the width of tiger whiskers in the simulation is about 0.7 μm, which is smaller than the diffraction-limited spot size.

In intensity imaging systems, it is common to characterize their performance by an optical transfer function. Extending this notion to a computational imaging system, in principle, the overall frequency response can be found by dividing the spectrum of the recovered image by that of the input object. Thus, to find the overall frequency response, the images of a point source can be calculated at various object distances, and the maximum entropy algorithm can be applied to these intermediate images to recover the point object. The recoveries can be considered as the combined impulse response of the integrated computational imaging system. A Fourier transform of the recoveries is plotted in FIG. 15. The curves are the combined transfer functions of the system over a range of object distances. The transfer function of the system is circularly symmetric, and FIG. 15 shows its values along the radial direction over a range of focal depths. The relative spatial frequency 1.0 corresponds to a cutoff frequency of the diffraction-limited lens for the same imaging settings. The amplitude of the overall transfer function of the new system is increased to the diffraction limit over an extended object range. In addition, the phase of the overall transfer function is zero due to the circular symmetry of the impulse response. The diffraction-limited performance for the integrated computational imaging system over an extended depth of field is clearly seen from these curves.

Figure 16:
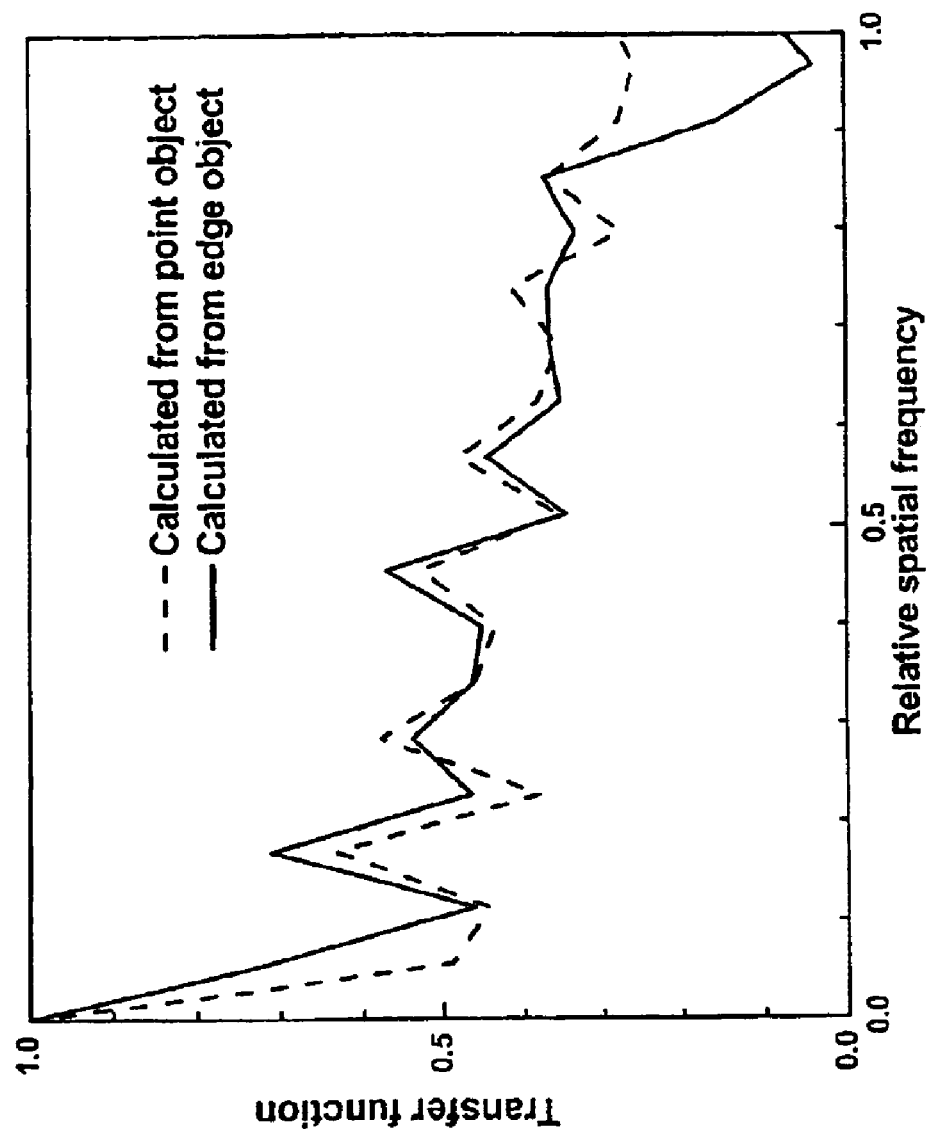
FIG. 16 is a graph depicting the relatively small difference between the overall transfer functions of the integrated imaging system using a point object and an edge object, according to an illustrative aspect of the invention.

However, the concept of overall transfer function is only an approximate index of the system performance because of the nonlinear digital processing involved. In other words, different overall transfer functions can be expected for various objects. Nonetheless, the transfer function shown in FIG. 15 is a good indication of performance of the integrated imaging system. FIG. 16 references the overall transfer function for objects at a distance of s=1580 mm, where transfer functions for both a point and an edge object are plotted. The recoveries from the blur images by the logarithmic lens provide the overall point spread function and overall edge response function, respectively. From FIG. 16, it is apparent that the overall transfer functions are similar for these two cases.

From the foregoing description, it will be apparent that an improved system, method and apparatus for imaging are provided using a multifocal imaging system in which spherical aberration is the predominate form of blur for intermediate imaging and in which a central obscuration can be used for making more intermediate images more susceptible to correction by digital processing for increasing both resolution and depth of field. Variations and modifications in the herein described system, method, and apparatus will undoubtedly become apparent to those skilled in the art within the overall spirit and scope of the invention.

We claim:

1. An imaging system for recording an extended depth of field, comprising:
   a multifocal imaging subsystem including an optical imaging element having a maximum radius, R, that produces an intermediate image of an object, wherein the multifocal imaging subsystem has a controlled amount of spherical aberration that imparts a purposeful blur to the intermediate image that is substantially uniform over the focal range of the multifocal imaging subsystem, and a phase plate that produces the controlled amount of spherical aberration, located at an aperture stop of the subsystem;
   a digital processing system that receives the blurred, intermediate image and calculates a non-blurred, recovered image; and,
   provided a criteria is met, the multifocal imaging subsystem including a central obscuration having a radius, $\delta R$, wherein the criteria is that $1/6 \leq \delta R/R < 1$, otherwise $\delta R$ being zero and the central obscuration is absent.

2. The system of claim 1 in which the controlled amount of spherical aberration is between $1.6\lambda$ and $6\lambda$ in nominal wavelengths of imaging light.

3. The system of claim 1 in which the controlled amount of spherical aberration is predominately third-order spherical aberration.

4. A method of providing an image of an object over an extended depth of field than provided by a typical diffraction-limited imaging system, comprising:

providing a multifocal imaging subsystem having a maximum aperture radius, R, as a part of an integrated computational imaging system, and providing a central obscuration in the multifocal imaging subsystem having a maximum obscuration radius, $\delta R$, provided that $1/6 \delta R/R < 1$;
forming an intermediate image of an object that is purposefully, uniformly blurred by a controlled amount of spherical aberration over a focal range of the multifocal imaging subsystem, such that the system impulse response is approximately invariant over the focal range; and
recovering an unblurred image from the blurred intermediate image.

5. The method of claim 4, comprising blurring the intermediate image with a controlled amount of predominately third-order spherical aberration.

6. The method of claim 4, wherein the spherical aberration provides a phase delay of between $1.6\lambda$ and $6\lambda$ in nominal wavelengths of imaging light.

7. The method of claim 4, wherein recovering the unblurred image from the blurred intermediate image comprises performing an iterative digital deconvolution of the blurred, intermediate image using a maximum entropy algorithm.

8. The method of claim 7, wherein maximum entropy algorithm includes the step of estimating a new image containing a combination of directional images that include a metric parameter.

9. The method of claim 8, wherein maximum entropy algorithm includes the step of altering the directional images using the metric parameter to speed convergence toward the recovered image while avoiding points of stagnation.

10. The method of claim 8 in which the metric parameter has a non-integer value.

11. The method of claim 10 in which the metric parameter has a value between 0.2 and 0.6.

12. The method of claim 8 in which the directional images include pixel values, and the metric parameter adjusts weights among the pixel values.

13. The method of claim 8 in which the metric parameter is adjusted above zero to give larger pixel values more weight.

14. The method of claim 8 in which the maximum entropy method results in a modulation transfer function having a shape that increases contrast at high spatial frequencies approaching a Nyquist limit.

15. The method of claim 7, wherein the iterative digital deconvolution method for image processing comprises the steps of: calculating a succession of estimated images of an object based on a starting image and combination of directional images; inputting a metric parameter that modifies the directional images; evaluating the estimated images modified according to the metric parameter against a criterion of entropy maximization and a statistical noise parameter to choose a closer estimate of the object; and outputting an enhanced image of the object over the starting image.

16. The method of claim 15 in which the estimated images contain pixel values and the metric parameter alters weights assigned to the pixel values.

17. The method of claim 15 in which the metric parameter has a non-integer value.

18. The method of claim 17 in which the metric parameter has a value between 0.2 and 0.6.

* * * * *

UNITED STATES PATENT AND TRADEMARK OFFICE
CERTIFICATE OF CORRECTION

PATENT NO. : 7,511,895 B2  
APPLICATION NO. : 11/956553  
DATED : March 31, 2009  
INVENTOR(S) : Nicholas George and Wanli Chi Page 1 of 1

It is certified that error appears in the above-identified patent and that said Letters Patent is hereby corrected as shown below:

Please correct the typograpical error as follows:

claim 4, column 26, line 5, replace "$1/6\delta R/R<1$" with "$1/6 \leq \delta R/R < 1$"

Signed and Sealed this

Second Day of June, 2009

JOHN DOLL  
*Acting Director of the United States Patent and Trademark Office*